(12) United States Patent
Vaughn et al.

(10) Patent No.: US 9,830,439 B2
(45) Date of Patent: Nov. 28, 2017

(54) TECHNIQUES FOR ENTERING CODES ON COMPUTING DEVICES

(71) Applicant: QUALCOMM Incorporated, San Diego, CA (US)

(72) Inventors: Joseph Vaughn, San Diego, CA (US); Jean-Laurent Ngoc Huynh, San Diego, CA (US); Shih-Chieh Su, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 0 days.

(21) Appl. No.: 14/872,486

(22) Filed: Oct. 1, 2015

(65) Prior Publication Data
US 2017/0098065 A1    Apr. 6, 2017

(51) Int. Cl.
| | | |
|---|---|---|
| *G06F 21/31* | (2013.01) | |
| *H04B 1/3827* | (2015.01) | |
| *G06F 3/0488* | (2013.01) | |
| *G06F 3/01* | (2006.01) | |
| *G06F 3/0484* | (2013.01) | |

(52) U.S. Cl.
CPC ............ *G06F 21/316* (2013.01); *G06F 3/016* (2013.01); *G06F 3/0484* (2013.01); *G06F 3/04883* (2013.01); *H04B 1/3833* (2013.01)

(58) Field of Classification Search
None
See application file for complete search history.

(56) References Cited

U.S. PATENT DOCUMENTS

| | | |
|---|---|---|
| 8,130,075 B1 | 3/2012 | Hingole |
| 8,358,196 B2 | 1/2013 | Yang |

(Continued)

FOREIGN PATENT DOCUMENTS

EP    2463797 A1    6/2012

OTHER PUBLICATIONS

Xiang et al.; "Swipeboard: A Text Entry Technique for Ultra-Small Interfaces That Supports Novice to Expert Transitions"; 2014; Retrieved from the Internet <URL: http://dl.acm.org/citation.cfm?id=2647354 >; pp. 1-6 as printed.*

(Continued)

*Primary Examiner* — Saleh Najjar
*Assistant Examiner* — Michael Chao
(74) *Attorney, Agent, or Firm* — Hunter Clark PLLC

(57) ABSTRACT

Techniques for securing a computing device are provided. An example method detecting contact with a touchscreen of the computing device, monitoring the contact with the touchscreen to determine whether the contact matches a predetermined pattern of movement, and performing one or more predetermined actions responsive to the contact with the touchscreen matching the predetermined pattern. The predetermined pattern includes a plurality of predetermined movements separated by pivot points. The pivot points represent a transition point in the predetermined pattern from a first type of movement to a second type of movement. The contact with the touchscreen can be broken at one or more of at least one pivot point, between a first instance of the first type of movement and a second instance of the first type of movement, or between a first instance of the second type of movement and a second instance of the second type of movement.

31 Claims, 9 Drawing Sheets

Swipe Pattern:
1) Left to Right 3 Times
2) Bottom to Top 3 Times
3) Top to Bottom 1 Time
4) Stop

(56) References Cited

U.S. PATENT DOCUMENTS

| | | | |
|---|---|---|---|
| 8,522,327 B2* | 8/2013 | Broder | G06F 21/31 726/7 |
| 2009/0113294 A1* | 4/2009 | Sanghavi | G06F 17/211 715/269 |
| 2012/0165961 A1* | 6/2012 | Folscheid | G06F 21/81 700/17 |
| 2013/0167074 A1 | 6/2013 | Oonishi et al. | |
| 2013/0318598 A1* | 11/2013 | Meacham | G06F 3/0488 726/19 |
| 2013/0333020 A1 | 12/2013 | Deshpande | |
| 2014/0009421 A1 | 1/2014 | Lee et al. | |
| 2014/0013414 A1 | 1/2014 | Bruck | |
| 2014/0298430 A1 | 10/2014 | Tomasik et al. | |
| 2015/0089634 A1 | 3/2015 | Deluca | |
| 2015/0123925 A1 | 5/2015 | Qin et al. | |
| 2015/0128255 A1 | 5/2015 | Kuscher et al. | |
| 2015/0205487 A1* | 7/2015 | Lin | G06F 3/04817 715/823 |
| 2015/0235024 A1* | 8/2015 | Corrion | G06F 21/56 726/18 |
| 2015/0294096 A1* | 10/2015 | Grigg | G06F 21/32 726/5 |

OTHER PUBLICATIONS

Le et al.; NemoAuth: A Mnemonic Multimodal Approach to Mobile User Authentication; 2013; Retrieved from the Internet <URL: http://ieeexplore.ieee.org/abstract/document/6719039/>; pp. 1-6, as printed.*

Takada et al.; Awase-E: Image-Based Authentication for Mobile Phones Using User's Favorite Images; 2003; Retrieved from the Internet <URL: https://link.springer.com/chapter/10.1007%2F978-3-540-45233-1_26; pp. 1-6, as printed.*

International Search Report and Written Opinion—PCT/US2016/045277—ISA/EPO—dated Oct. 4, 2016—11 pgs.

Second Written Opinion from International Application No. PCT/US2016/045277—European Patent Office—Munich, Germany—dated May 2, 2017—6 pgs.

* cited by examiner

Computing Device

Computing Device

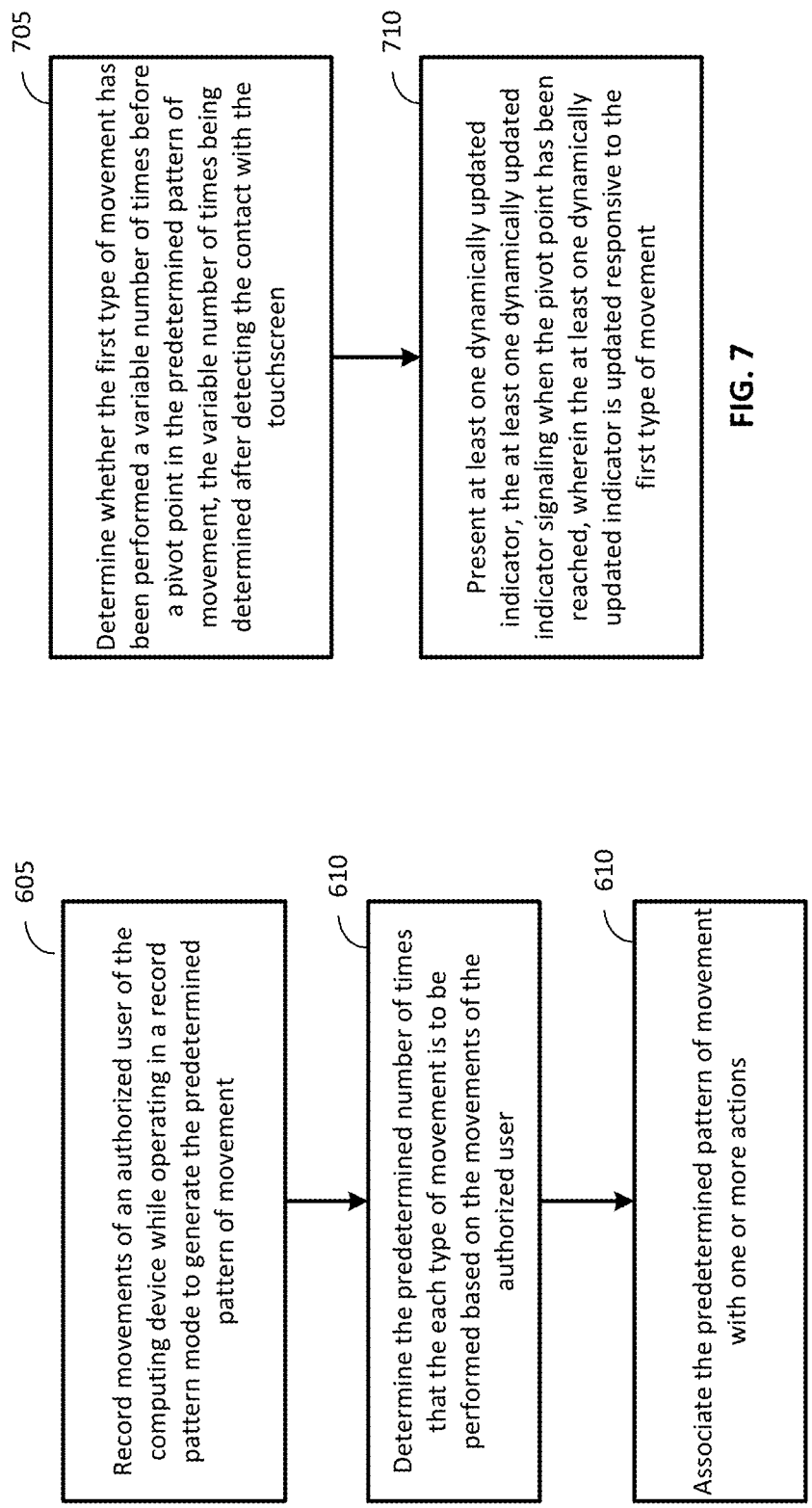

Swipe Pattern:
1) Left to Right 3 Times
2) Bottom to Top 3 Times
3) Top to Bottom 1 Time
4) Stop Swipe Pattern:
1) Left to Right Until 2$^{nd}$ "A"
2) Bottom to Top Until 1$^{st}$ "3"
3) Top to Bottom Until 2$^{nd}$ "C"
4) Stop

TECHNIQUES FOR ENTERING CODES ON COMPUTING DEVICES

BACKGROUND

Pattern passwords are commonly used to secure computing devices, such as mobile phones, tablets, and other devices having a touchscreen or other similar input device. An authorized person can attempt to gain access to the by using an exploit by observing the "smudge" left on the touchscreen of the computing device. Oils from the hand of the user entering the password can leave a distinct pattern that the unauthorized party can observe and from which the pattern password may be deduced. PINs are less susceptible to such attacks, but PINS can limit the possible length of the password, especially on small-form factor devices, such as smart watches. Typed passwords are also not easily entered (especially on small form factor devices).

SUMMARY

An example method for securing a computing device according to the disclosure includes detecting contact with a touchscreen of the computing device, monitoring the contact with the touchscreen to determine whether the contact matches a predetermined pattern of movement, and performing one or more predetermined actions responsive to the contact with the touchscreen matching the predetermined pattern of movement. The predetermined pattern of movement includes a plurality of predetermined movements separated by pivot points. The pivot points represent a transition point in the predetermined pattern of movement from a first type of movement to a second type of movement. The contact with the touchscreen need not be maintained between the plurality of predetermined movements. The contact with the touchscreen is broken at one or more of at least one pivot point, between a first instance of the first type of movement and a second instance of the first type of movement, or between a first instance of the second type of movement and a second instance of the second type of movement.

An example method according to the disclosure can also include one or more of the following features. Monitoring the contact with the touchscreen to determine whether the contact matches the predetermined pattern of movement includes determining whether the first type of movement has been performed a predetermined number of times before a pivot point in the predetermined pattern of movement. Recording movements of an authorized user of the computing device while operating in a record pattern mode to generate the predetermined pattern of movement, and determining the predetermined number of times that the first type of movement is performed based on the movements of the authorized user. Monitoring the contact with the touchscreen to determine whether the contact matches the predetermined pattern of movement comprises determining whether the first type of movement has been performed a variable number of times before a pivot point in the predetermined pattern of movement, the variable number of times being determined after detecting the contact with the touchscreen. Determining a number of times that the first type of movement is to be performed before reaching the pivot point based on the predetermined pattern of movement. Presenting at least one dynamically updated indicator, the at least one dynamically updated indicator signaling when the pivot point has been reached, where the at least one dynamically updated indicator is updated responsive to the first type of movement. The at least one dynamically updated indicator comprises one or more of a color, pattern, letter, shape, number, sound, haptic feedback, or other indicator known to an authorized user of the computing device. Monitoring the contact with the touchscreen to determine whether the contact matches a second predetermined pattern of movement, and performing one or more actions responsive to the contact matching the second predetermined pattern of movement. Performing the unlock action comprises at least one of unlocking the computing device or unlocking a file. The second predetermined pattern of movement can be associated with a duress code or any other code that is associated with a predetermined set of actions.

A computing device according to the disclosure includes means for detecting contact with a touchscreen of the computing device, means for monitoring the contact with the touchscreen to determine whether the contact matches a predetermined pattern of movement, and means for performing an unlock action responsive to the contact with the touchscreen matching the predetermined pattern of movement. The predetermined pattern of movement includes a plurality of predetermined movements separated by pivot points. The pivot points represent a transition point in the predetermined pattern of movement from a first type of movement to a second type of movement. The contact with the touchscreen need not be maintained between the plurality of predetermined movements. The contact with the touchscreen is broken at one or more of at least one pivot point, between a first instance of the first type of movement and a second instance of the first type of movement, or between a first instance of the second type of movement and a second instance of the second type of movement.

Implementations of such a computing device can include one or more of the following features. The means for monitoring includes means for determining whether the first type of movement has been performed a predetermined number of times before a pivot point in the predetermined pattern of movement. Means for recording movements of an authorized user of the computing device while operating in a record pattern mode to generate the predetermined pattern of movement, where the means for recording includes means for determining the predetermined number of times that the first type of movement is performed based on the movements of the authorized user. The means for monitoring includes means for determining whether the first type of movement has been performed a variable number of times before a pivot point in the predetermined pattern of movement. Means for determining a number of times that the first type of movement is to be performed before reaching the pivot point based on the predetermined pattern of movement. Means for presenting at least one dynamically updated indicator, the at least one dynamically updated indicator signaling when the pivot point has been reached, where the means for presenting comprises means for updating the at least one dynamically updated indicator responsive to the first type of movement. The at least one dynamically updated indicator comprises one or more of a color, letter, shape, number, sound, haptic feedback, or other indicator known to an authorized user of the computing device. Means for monitoring the contact with the touchscreen to determine whether the contact matches a second predetermined pattern of movement, and means for performing one or more actions responsive to the contact matching the second predetermined pattern of movement. The means for performing the unlock action includes at least one of means for unlocking the computing device or means for unlocking a file. The second predetermined pattern of movement can be associated with a duress code or any other code that is associated with a predetermined set of actions.

A computing device according to the disclosure includes a memory and at least one processor coupled to the memory. The at least one processor is configured to detect contact with a touchscreen of the computing device, monitor the contact with the touchscreen to determine whether the contact matches a predetermined pattern of movement, and perform an unlock action responsive to the contact with the touchscreen matching the predetermined pattern of movement. The predetermined pattern of movement includes a plurality of predetermined movements separated by pivot points. The pivot points represent a transition point in the predetermined pattern of movement from a first type of movement to a second type of movement. The contact with the touchscreen need not be maintained between the plurality of predetermined movements. The contact with the touchscreen is broken at one or more of at least one pivot point, between a first instance of the first type of movement and a second instance of the first type of movement, or between a first instance of the second type of movement and a second instance of the second type of movement.

Implementations of such a computing device can include one or more of the following features. The at least one processor is configured to determine whether the first type of movement has been performed a predetermined number of times before a pivot point in the predetermined pattern of movement. The at least one processor is further configured to record movements of an authorized user of the computing device while operating in a record pattern mode to generate the predetermined pattern of movement, and determine the predetermined number of times that the first type of movement is performed based on the movements of the authorized user. The at least one processor is configured to determine whether the first type of movement has been performed a variable number of times before a pivot point in the predetermined pattern of movement, the variable number of times being determined after detecting the contact with the touchscreen. The at least one processor is further configured to determine a number of times that the first type of movement is to be performed before reaching the pivot point based on the predetermined pattern of movement. The at least one processor is further configured to monitor the contact with the touchscreen to determine whether the contact matches a second predetermined pattern of movement, and perform one or more actions responsive to the contact matching the second predetermined pattern of movement. The at least one processor being configured to perform the unlock action is configured to at least one of unlock the computing device or unlock a file. The second predetermined pattern of movement can be associated with a duress code or any other code that is associated with a predetermined set of actions.

A non-transitory, computer readable medium, having stored thereon computer-readable instructions for securing a computing device, according to the disclosure includes instructions configured to cause the computing device to detect contact with a touchscreen of the computing device, monitor the contact with the touchscreen to determine whether the contact matches a predetermined pattern of movement, and perform an unlock action responsive to the contact with the touchscreen matching the predetermined pattern of movement. The predetermined pattern of movement includes a plurality of predetermined movements separated by pivot points. The pivot points represent a transition point in the predetermined pattern of movement from a first type of movement to a second type of movement. The contact with the touchscreen need not be maintained between the plurality of predetermined movements. The contact with the touchscreen is broken at one or more of at least one pivot point, between a first instance of the first type of movement and a second instance of the first type of movement, or between a first instance of the second type of movement and a second instance of the second type of movement.

Implementations of such a non-transitory, computer-readable medium can include one or more of the following features. The instructions configured to cause the computing device to monitor the contact with the touchscreen to determine whether the contact matches the predetermined pattern of movement include instructions configured to cause the computer to determine whether the first type of movement has been performed a predetermined number of times before a pivot point in the predetermined pattern of movement. Instructions configured to cause the computing device to record movements of an authorized user of the computing device while operating in a record pattern mode to generate the predetermined pattern of movement, and determine the predetermined number of times that the first type of movement is performed based on the movements of the authorized user. The instructions configured to cause the computing device to monitor the contact with the touchscreen to determine whether the contact matches the predetermined pattern of movement include instructions configured to cause the computer to determine whether the first type of movement has been performed a variable number of times before a pivot point in the predetermined pattern of movement, the variable number of times being determined after detecting the contact with the touchscreen. Instructions configured to cause the computing device to determine a number of times that the first type of movement is to be performed before reaching the pivot point based on the predetermined pattern of movement.

BRIEF DESCRIPTION OF THE DRAWINGS

FIG. 6 is a flow diagram of an example process for capturing a predetermined pattern of movement according to the techniques discussed herein.

FIG. 7 is a flow diagram of an example process for determining whether a predetermined pattern of movement has been detected according to the techniques discussed herein.

DETAILED DESCRIPTION

Figure 1:
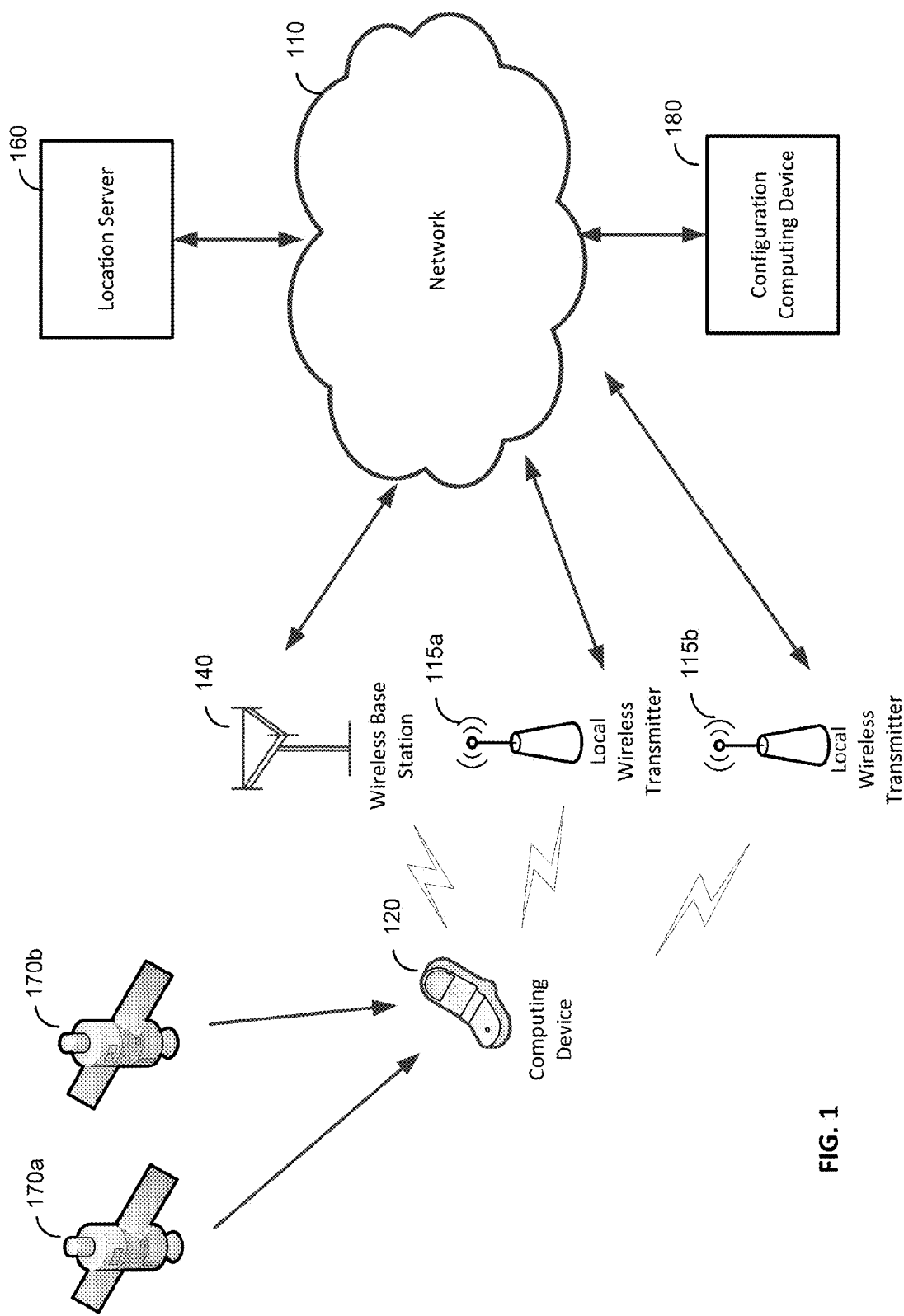
FIG. 1 is a block diagram of an example network architecture, which may be suitable for implementing the techniques discussed herein.

Techniques for securing a computing device are provided. The techniques include detecting contact with a touchscreen of the computing device, monitoring the contact with the touchscreen to determine whether the contact matches a predetermined pattern of movement, and performing one or more predetermined actions responsive to the contact with the touchscreen matching the predetermined pattern of movement. The predetermined pattern of movement includes multiple types of movements separated by pivot points. The pivot points represent a transition point in the predetermined pattern of movement from a first type of movement to a second type of movement. A predetermined pattern of movement can have multiple pivot points and can include two or more different types of movement. The contact with the touchscreen need not be maintained between the plurality of predetermined movements as required by conventional pattern lock techniques used to secure many mobile devices. The contact with the touchscreen can be broken at one or more of at least one pivot point, between a first instance of the first type of movement and a second instance of the first type of movement, or between a first instance of the second type of movement and a second instance of the second type of movement. The figures and the following description provide example processes for implementing these techniques. The technique discussed herein can be used with small form factor devices, such as smart watches, as well as devices such as tablet computers, FIG. 1 is a block diagram of an example network architecture, which may be suitable for implementing the techniques discussed herein. The particular configuration illustrated herein is merely an example of one network configuration in which the techniques disclosed herein may be used. Furthermore, an implementation of such a network architecture may include additional elements that are not illustrated herein and have been omitted for the sake of clarity. The example network architecture provides an example of a network environment in which a computing device in which the techniques disclosed herein may be implemented can operate.

The computing device 120 may also be a mobile communication device referred to as a User Equipment (UE), a mobile station, a terminal, an access terminal, a subscriber unit, a station, etc. The computing device 120 may be a smartphone, a tablet computer, a laptop computer, game console, wearable device (such as a smart watch) or other device that includes a wireless transmitter that is configured to communicate using one or more wireless communications protocols, including, but not limited to, the Long Term Evolution (LTE), WLAN, and WiMAX wireless communications protocols. The computing device 120 can also be configured to support other types of wireless communications protocols and can be configured to support multiple different wireless communications protocols. The wireless transmitter of the computing device 120 can be configured to send data to and/or receive data from other devices, the wireless transmitters 115, and/or one or more wireless base stations, such as wireless base station 140.

The computing device 120 can also be configured to measure signals from one or more wireless base stations or wireless access points, such as the wireless transmitters 115 and the wireless base station 140, and obtain timing measurements (e.g., for time of arrival (TOA) or observed time difference of arrival (OTDOA)), signal strength measurements (e.g., Receive Signal Strength Indication (RSSI)), RTT (round-trip time) and/or signal quality measurements for the wireless base stations. The pseudo-range measurements, timing measurements, signal strength measurements, and/or signal quality measurements may be used to derive a location estimate for the computing device 120. A location estimate may also be referred to as a position estimate, a position fix, etc. Two terrestrial wireless transmitters are illustrated in this example: 115a and 115b. However, in other implementations, more or less wireless transmitters 115 may be included. The computing device 120 can also be configured to use a combination of signals from one or more of the satellites 170, the wireless base station 140, and/or the wireless transmitters 115 to determine a position of the computing device 120.

Each of the wireless transmitters 115 can comprise a WLAN wireless access point configured to operate using the IEEE 802.11 wireless communication standards. But, in some implementations some or all of the wireless transmitters 115 may be configured to utilize other wireless communications protocols, and some network environments may include more than one type of wireless transmitter. Furthermore, while the wireless transmitters 115 are identified as transmitters, the wireless transmitters 115 may be transceivers configured to send and/or receive data wirelessly. The wireless transmitters 115 can be connected to network 110 via a backhaul connection that provides a broadband connection to the network 110. The network 110 may be the Internet and/or a combination of one or more networks. For example, the wireless transmitter (such as one of the wireless transmitters 115) may be connected to a DSL modem or a cable modem, depending upon the type of broadband service being used in that particular implementation. A wireless transmitter (such as one of the wireless transmitters 115) can be associated with a mobile communication network provider and can be configured to communicate with the mobile communication network provider's network (not shown) via the network 110. The coverage area of the a wireless transmitter (such as one of the wireless transmitters 115) may overlap with that of one or more macrocell base stations, such as wireless base station 140, or that of one or more other terrestrial transceivers.

The wireless base station 140 can be configured to provide wireless network connectivity to a plurality of mobile devices, such as computing device 120. The wireless base station 140 can comprise a macrocell base station, a femtocell base station, a picocell base station, or other type of base station. The wireless base station 140 may have a much larger coverage area than the wireless transmitter (such as one of the wireless transmitters 115) or may be a terrestrial transceiver that provides a coverage area that is of a similar size or of a smaller size than the coverage area provided by the wireless transmitters 115. Wireless base station 140 can be configured to communicate using one or more wireless communications protocols. While the example illustrated in FIG. 1 includes on a single wireless base station, in other implementations the network environment is likely to include more than wireless base station 140 which have coverage areas that may overlap at least in part.

The computing device 120 can be configured to include a Global Navigation Satellite System (GNSS) receiver configured to receive and measure signals from one or more satellites 170, such as satellite 170*a* and satellite 170*b*, and to obtain pseudo-range measurements for the satellites 170. Satellites 170 may be part of a Global Navigation Satellite System (GNSS), which may be the United States Global Positioning System (GPS), the European Galileo system, the Russian GLONASS system, or some other GNSS. The GNSS receiver may also be configured to detect and receive signals from satellites 170 belonging to more than one GNSS system. For example, satellite 170*a* could belong to the GPS system while the satellite 170*b* could belong to the Galileo system. While the example network architecture illustrated herein illustrates only two satellites, other implementations may have more or less satellites available, may have satellites associated with one or more GNSS system, and the number of satellites visible to the computing device 120 may depend upon the current geographical location of the computing device 120 and the orbits of the satellites 170. Typically, the computing device 120 will attempt to acquire signals from at least four SVs in order to perform trilateration to determine the location of the computing device 120.

The location server 160 can be configured to provide location services to the computing device 120. For example, the location server 160 can be configured to provide almanac information and/or other information that the computing device 120 can use to determine the position of the computing device 120. The location server 160 can also be configured to assist the computing device 120 in determining the position of the computing device 120. For example, the location server 160 can be configured to receive signal measurements of signals received at the computing device 120 from wireless transmitters 115 and/or wireless base stations (such as wireless base station 140) and to determine a position of the computing device 120 based on those signals. While the location server 160 is represented as a single entity in the example implementation illustrated in FIG. 1, the logical functions performed by the location server 160 discussed herein can be implemented by more than one network entity. The computing device 120 can be configured to take into account the location of the computing device 120 when determining which actions to take responsive to a predetermined pattern of movement. The actions associated with a predetermined pattern of movement may be enabled and/or disabled depending upon the location of the computing device 120. Furthermore, the types of actions that are performed can vary based on the location of the computing device 120. A predetermined pattern of movement can be associated with a first set of actions if the computing device 120 is located at first location and a second set of actions if the computing device 120 is located at a second location. To illustrate this concept, a predetermined pattern of movement can be associated with a first location, which is the home of the user of the computing device, and a second location, which is the workplace of the user of the computing device. The predetermined pattern of movement can be associated with unlocking the computing device 120 and opening a personal email application and a social media application when the user enters the predetermined pattern of movement and the computing device 120 is located at the home of the user, and the predetermined pattern of movement can be associated with unlocking the computing device 120 and opening a work-related email application and a calendar application when the computing device is located at the workplace of the user.

The configuration computing device 180 can be a computing device similar to the computing device 120, and can be used to implement any of the processes discussed herein with respect to the computing device 120. The configuration computing device 180 can be used to set up one or more predetermined patterns of movement for the computing device 120, the configuration computing device 180, and/or other computing devices and can be configured to set up predetermined patterns of movements for use on one or more computing devices including setting up predetermined patterns of movement for use any of these computing devices. The configuration computing device 180 can provide a centralized means for capturing, maintaining, and modifying one or more predetermined patterns of movements that can be used by one or more computing devices. The computing device 120 may have a small form factor, such as a smartwatch, and the constrained size of the touchscreen of the computing device 120 may limit the user's ability to record and maintain predetermined patterns of movement. The computing device 120 may not include a physical keyboard, like many smartphones or tablet computers, and using the configuration computing device 180 to set up predetermined patterns of movements for the computing device 120 may be more convenient. Furthermore, the user may have multiple computing devices and may wish to set up and manage the predetermined patterns of movements and their associated actions for these devices without having to configure each device individually. The user can instead record predetermined patterns of movement and associate actions with those predetermined patterns of movement that can be use by one, a subset, or all of the multiple computing devices.

The configuration computing device 180 can be connected to the computing device 120 either directly or indirectly using a wired or wireless connection that allows the user to access one or more user interfaces that allow the user to capture one or more predetermined patterns of movement that can be used on the computing device 120, the configuration computing device 180, and/or any other computing devices associated with the user. The user interface can also allow the user to define one or more actions to be taken responsive to each predetermined patterns of movement being entered on the computing device 120. The configuration computing device 180 can also be configured to log into a security account associated with the computing device 120 that may be located on the location server 160 or another network entity, such as a network service provider associated with the computing device 120. The configuration computing device 180 can be used to capture one or more predetermined patterns of movement and to define one or more actions to be taken responsive to each predetermined patterns of movement being entered on the computing device 120 to be associated with the security account. The security account may be linked to the computing device 120, the configuration computing device 180, and/or other computing devices, and the one or more predetermined patterns of movement can be shared with each the computing devices associated with the security account. The security account can also include an interface that allows for certain predetermined patterns of movement to be associated with a selected subset of the computing devices associated with the security account.

The example network configuration illustrated in FIG. 1 is merely an example of one possible configuration of a network in which the techniques disclosed herein may be implemented. Other network configurations may include additional elements not illustrated in FIG. 1 and the various components may be interconnected in a different configuration than what is shown in FIG. 1. Furthermore, as discussed above, the computing device 120 can be implemented such that the computing device 120 includes a wired connection to the network 110 instead of or in addition to the wireless connections illustrated in FIG. 1. Furthermore, the computing device 120 can be configured to remain in a relatively fixed location, such as a set-top box, a server computer system, or desktop computer system that may be moved but typically remains in the same location in contrast to the implementation of the computing device 120 as a mobile device as illustrated in FIG. 1.

Figure 2:
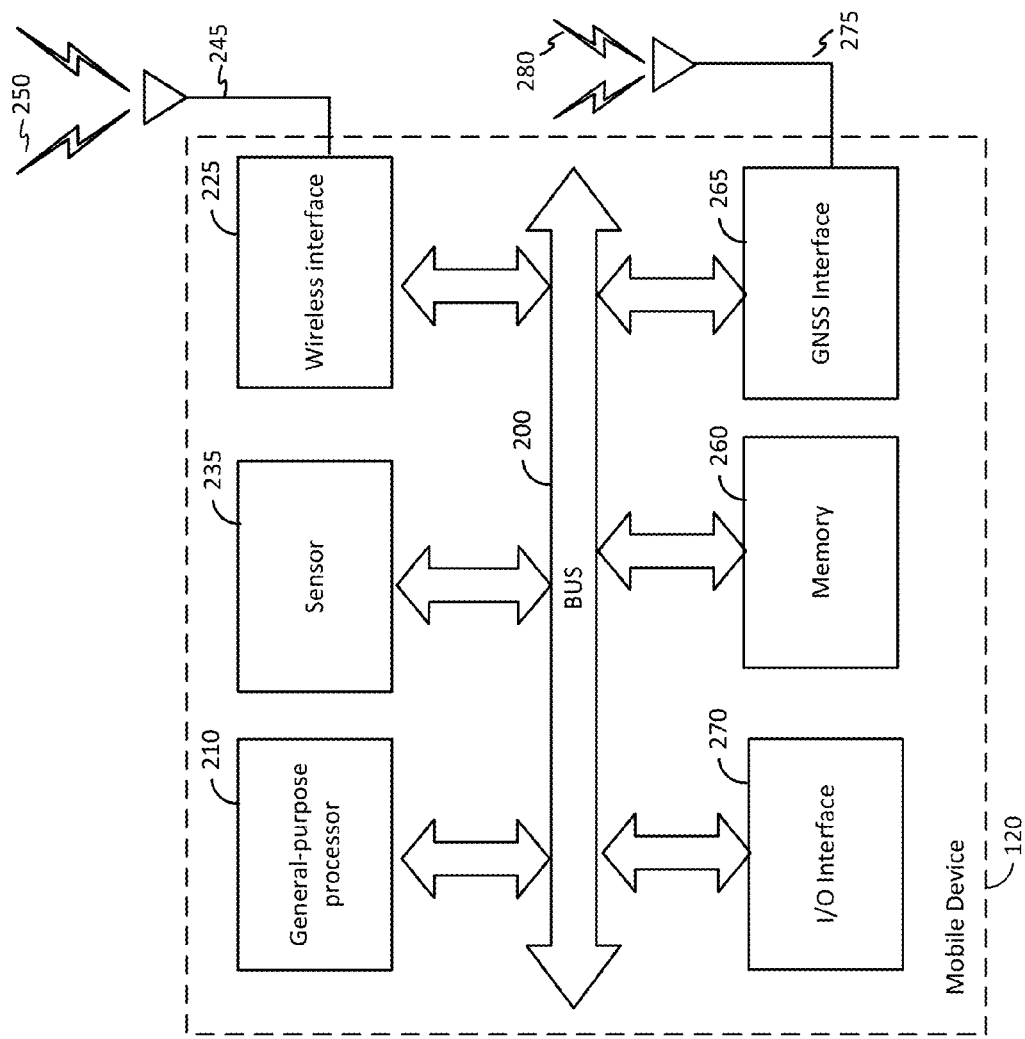
FIG. 2 is a block diagram of an example computing device that can be used to implement the computing device illustrated in FIG. 1.

FIG. 2 is a block diagram of a computing device that can be used to implement the computing device 120 and/or the configuration computing device 180 illustrated in FIG. 1. The computing device 120 and/or the configuration computing device 180 can be used to implement, at least in part, the processes illustrated in FIGS. 4-12. The computing device 120 and/or the configuration computing device 180 can be various types of computing devices, including but not limited to, laptop or other personal computer systems, tablet computers, mobile phones, smart phones, game consoles, wearable devices (e.g., a smart watch, head-mounted device, etc.) and/or other types of computing devices.

The computing device 120 comprises computer system including a processor 210, a wireless interface 225, at least one sensor 235, a GNSS interface 265, an I/O interface 270, and a memory 260, connected to each other by a bus 200. The memory 260 comprises a non-transitory memory. The processor 210 can be at least one general-purpose processor, and the computing device 120 or the configuration computing device 180 can comprise more than one processor. Other implementations of the computing device 120 or the configuration computing device 180 may include additional elements not illustrated in the example implementation of FIG. 2 and/or may not include all of the elements illustrated in the example embodiment illustrated in FIG. 2. For example, some implementations of the computing device 120 or the configuration computing device 180 may not include the GNSS interface 265 and/or the wireless interface 225. Furthermore, the computing device 120 or the configuration computing device 180 can include a wired network interface instead of or in addition to the wireless interface 225. The computing device 120 or the configuration computing device 180 may be implemented as a set-top box, desktop computing device, or other device that may be moved but typically not intended to be as portable as a mobile phone, tablet computer, a wearable device, or other such device that may be referred to as a mobile device.

The wireless interface 225 can include a wireless receiver, transmitter, transceiver, and/or other elements that enable the computing device 120 to send and/or receive data using WWAN, WLAN, and/or other wireless communication protocols. The wireless interface 225 can comprise one or more multi-mode modems capable of transmitting and receiving wireless signals using multiple wireless communications standards. The wireless interface 225 is connected an antenna 245 for sending and receiving communications to/from the wireless transmitters 115 as wireless signals 250, the wireless base station 140, and/or other wireless devices configured to communicate using wireless communication protocols. While the example implementation illustrated in FIG. 2 comprises a single wireless interface and a single antenna, other implementations of the computing device 120 or the configuration computing device 180 can include multiple wireless interfaces and/or multiple antennas.

I/O interface 270 can provide one or more ports and/or other interfaces that can provide for data inputs and/or outputs to the computing device 120. For example, the I/O interface 270 can include one or more ports, such as a Universal Serial Bus (USB) port and/or other type of port that can be used to connect external devices to the computing device 120 or the configuration computing device 180. The I/O interface 270 can also include one or more input devices, such as buttons, switches, a keypad, a touchscreen and/or other means for receiving input from a user. The I/O interface 270 can also include one or more means for outputting audio and/or visual content, such as a screen, a speaker, a headphone port and/or other means for outputting such content. The I/O interface 270 can also include one or more haptic feedback units that can be used to induce vibrations or motions in the computing device 120 or the configuration computing device 180. The one or more haptic feedback units can be configured to alert the user to some event and can be configured to provide more than one pattern of haptic feedback.

The GNSS interface 265 can include a GNSS receiver and/or other elements that enable the computing device 120 or the configuration computing device 180 to receive signals from transmitters associated with one or more GNSS systems. The GNSS interface 265 is connected to an antenna 275 for receiving signals 280 from the GNSS transmitters, such as the satellites 170 illustrated in FIG. 1. The computing device 120 or the configuration computing device 180 can be configured to use signals received from satellites associated with satellites and other transmitters associated with the GNSS systems to determine a position of the computing device 120 or the configuration computing device 180 in which the GNSS interface is included. The computing device 120 or the configuration computing device 180 can also be configured to use the signals received from the satellites and other transmitters associated with the GNSS systems in conjunction with signals received from wireless transmitters 115 and/or wireless base stations (such as wireless base station 140) to determine a position of the computing device 120 or the configuration computing device 180.

The at least one sensor 235 can comprise one or more sensors that can be used to collect data. The at least one sensor 235 can include a gyroscope that can be used to determine a three dimensional (3D) orientation of the computing device 120 or the configuration computing device 180. The at least one sensor 235 can also include a magnetometer, which can serve as a compass that can determine the orientation of the device relative to the Earth's magnetic field. The at least one sensor 235 can also include other types of sensors, such as a fingerprint sensor or other types of sensors that can be used to obtain biometric readings from a user of the device and which could be used as a password for locking and/or unlocking content on the device. The computing device 120 or the or the configuration computing device 180 can be configured to use biometric readings in addition to the predetermined patterns of movements discussed herein for securing the device and the contents thereof.

The at least one sensor 235 can also include a pressure sensor that can be used to measure atmospheric pressure around the device, which can be used to determine an altitude at which the device. The at least one sensor 235 can also include one or more accelerometers that can be used to measure changes in velocity in axial dimensions. The at least one sensor 235 can also include rotational vector sensors for detecting rotation of the computing device 120. The at least one sensor 235 can also include a touchscreen for measuring tactile inputs, such as the user input and/or contact with a portion of the user's body or other object.

The processor 210 can be an intelligent device, e.g., a personal computer central processing unit (CPU), a microcontroller, an application specific integrated circuit (ASIC), etc. The memory 260 is a non-transitory storage device that can include random access memory (RAM), read-only memory (ROM), or a combination thereof. The memory 260 can store processor-readable, processor-executable software code containing instructions for controlling the processor 210 to perform functions described herein (although the description may read that the software performs the function(s)). The software can be loaded onto the memory 260 by being downloaded via a network connection, uploaded from a disk, etc. Further, the software may not be directly executable, e.g., requiring compiling before execution.

The software in the memory 260 is configured to enable the processor 210 to perform various actions, including implementing sending and/or receiving data from the wireless transmitters 115, the wireless base station 140, other mobile devices. The software in the memory 260 can also configured to enable the processor 210 to perform all or part of one or more of the processes illustrated in FIGS. 4-12. The functional units discussed herein can be implemented in software, in hardware, or in a combination of hardware and software, including but not limited to analog and/or digital circuits.

Figure 3:
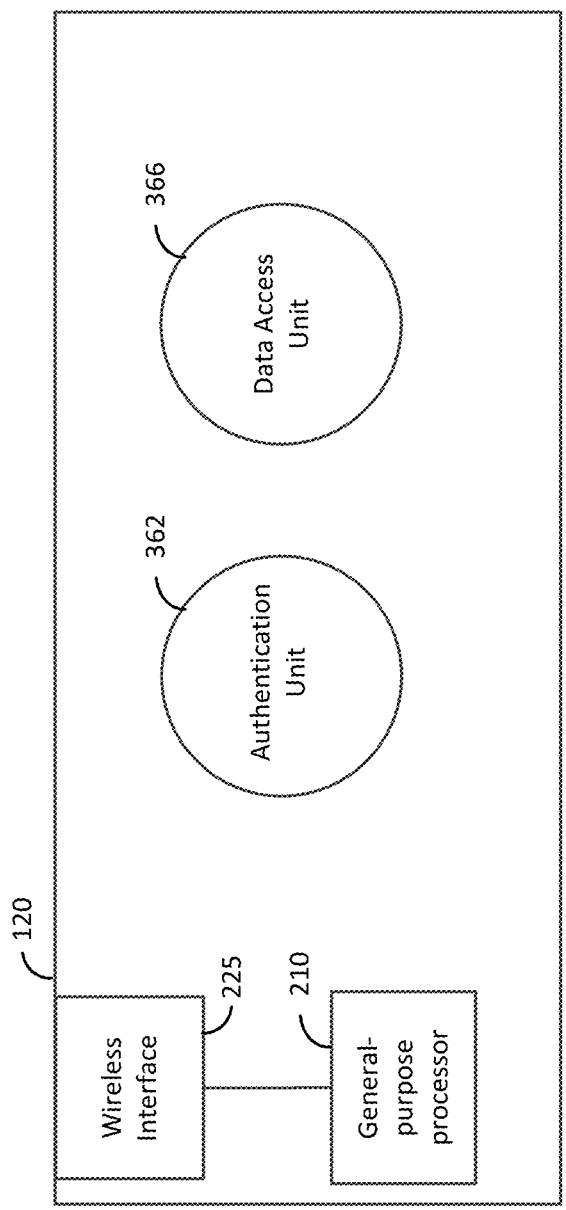
FIG. 3 is a functional block diagram of the computing device illustrated in FIG. 2 that illustrates functional units of the computing device.

FIG. 3 is a functional block diagram of the computing device 120 or the configuration computing device 180 illustrated in FIG. 2 that illustrates functional units of the memory 260 shown in FIG. 2. For example, the computing device 120 or the configuration computing device 180 can include an authentication unit 362 and a data access unit 366. The computing device 120 or the configuration computing device 180 may also include one or more additional functional units that provide other functionality to the device. The functional units illustrated in FIG. 3 can be implemented as software comprising processor-executable instructions stored in memory 260 or another memory of device that can be executed by the processor 210. The functional units illustrated in FIG. 3 can also be implemented as hardware components of the device, which can be components of the processor 210 or separate components from the processor 210. The functional units illustrated in FIG. 3 can also be implemented as a combination of hardware and software components. The example device illustrated in FIGS. 2 and 3 can be used to implement the computing device 120 or the configuration computing device 180 associated with the processes illustrated in FIGS. 4-12.

The authentication unit 362 can be configured to provide means for performing the various techniques disclosed herein, including those illustrated in FIGS. 4-12. The authentication unit can be configured to receive signals from the touchscreen of the device and to detect contact with the device based on the signals received from the touchscreen. The authentication unit can also be configured to monitor the contact with the touchscreen to determine whether the contact matches a predetermined pattern of movement and to perform one or more predetermined actions responsive to the contact with the touchscreen matching the predetermined pattern of movement. The predetermined pattern of movement can include a plurality of predetermined movements separated by pivot points. The pivot points represent a transition point in the predetermined pattern of movement from a first type of movement to a second type of movement. The contact with the touchscreen need not be maintained between the plurality of predetermined movements. The contact with the touchscreen can be broken at one or more of at least one pivot point, between a first instance of the first type of movement and a second instance of the first type of movement, or between a first instance of the second type of movement and a second instance of the second type of movement. Examples of some of the types of predetermined patterns of movement and associated one or more predetermined actions are discussed in detail with respect to the processes illustrated in FIGS. 4-12.

The authentication unit 362 can be configured to display indicia on the touchscreen of the computing device 120 and/or another display of the computing device 120 and/or to present audio and/or haptic feedback to the user of the computing device 120. The indicia displayed and/or presented to the user of the computing device 120 can be used to identify pivot points in a predetermined pattern of movement. These concepts will be further elaborated in the discussion of the examples illustrated in FIGS. 9-11.

The authentication unit 362 of the computing device 120 can be configured to use biometric readings obtained by at least one sensor 235 in addition to the predetermined patterns of movements discussed herein for securing the computing device 120 and the contents thereof.

Figure 12:
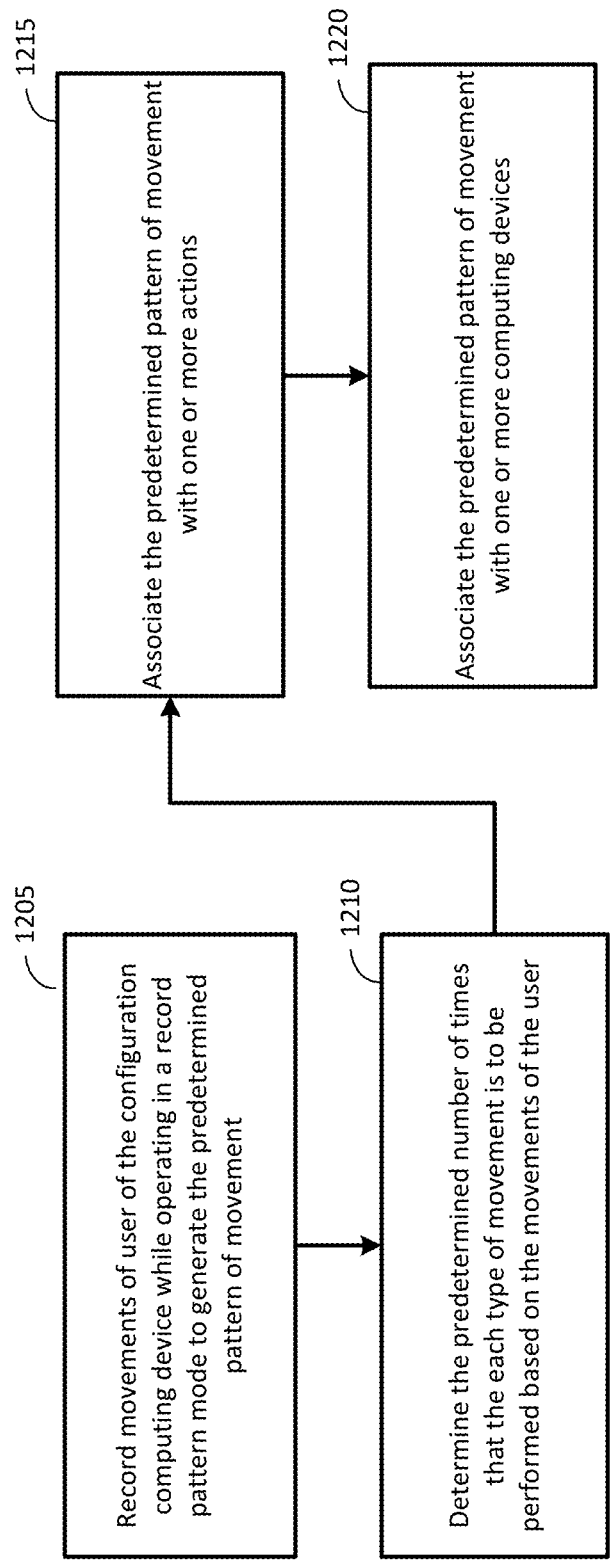
FIG. 12 is a flow diagram of an example process for capturing a predetermined pattern of movement for a first computing device using a second computing device according to the techniques discussed herein.

The authentication unit 362, when included in the configuration computing device 180, can provide means for implementing the process illustrated in FIG. 12 in which the configuration computing device 180 can capture one or more predetermined patterns of movements that can be used across multiple computing devices. The authentication unit 362 can provide a user interface that can be used to capture one or more predetermined patterns of movement that can be used on the computing device 120, the configuration computing device 180, and/or any other computing devices associated with the user. The user interface can also allow the user to define one or more actions to be taken responsive to each predetermined patterns of movement being entered on the computing device 120. The authentication unit 362 can also be configured to provide an interface that enables the user to log into a security account associated with the computing device 120 and/or the user of the computing device 120 that may be located on the location server 160 or another network entity, such as a network service provider associated with the computing device 120. Information associated with predetermined patterns of movements and the associated actions to be performed responsive to the predetermined patterns of movement can be associated with the security account, and the security account can be used to disseminate the information to one or more computing devices associated with the security account. The authentication unit 362 can be configured to send the information associated with the predetermined patterns of movement to one or more computing device 120 either directly or indirectly through a wired or wireless connection. The user interface provided by the authentication unit 362 can be configured to allow the user to enter an identifier one or more computing devices, such as computing device 120, to which the information should be sent. The security account can also include an interface that allows for certain predetermined patterns of movement to be associated with a selected subset of the computing devices associated with the security account.

The authentication unit 362 can also be configured to provide a user interface that allows a user to record one or more predetermined patterns of movement and one or more actions to take responsive to each of the predetermined patterns of movement. The authentication unit 362 can also be configured to allow the user to associate one or more locations with a predetermined pattern of movement, and each location can have one or more predetermined actions to be performed responsive to the computing device 120 being at that location. The authentication unit 362 can be configured to enable and/or disable the actions associated with a predetermined pattern of movement based on the location of the device.

The one or more predetermined actions include a wide variety of actions that the computing device 120 or the configuration computing device 180 is capable of performing. The one or more actions can include decrypting and/or unlocking access to content, applications, and/or certain functionality of the computing device or of one or more applications. The one or more actions can also include launching an application or applications on the device. The following examples illustrate some of the types of actions that can be associated with a predetermined pattern of movement. However, the one or more predetermined actions are not limited to these specific examples.

The predetermined pattern of movement can be an unlock code and the authentication unit 362 can be configured to perform one or more predetermined unlock actions responsive to the contact with the touchscreen matching the unlock code. The one or more predetermined actions can include providing the user with access to one or more applications on the computing device. The one or more applications may be associated with sensitive data, such as financial applications, or may be associated with protected content, such as digital rights management (DRM) protected content. The authentication unit 362 can also be configured to launch the one more applications responsive to the unlock code being entered.

The authentication unit 362 can be configured to unlock the access to the application, the file, or other content or functionality permanently once the unlock code associated with the application, the file, or other content is entered. The authentication unit 362 can be configured to can be configured to unlock access to the application, the file, or other content or functionality for a predetermined period of time once the unlock code has been entered. The authentication unit 362 can also be configured to unlock access to the application, the file, or other content until the computing device 120 is placed into a locked state, the user logs out of the computing device 120, and/or the computing device 120 is shutdown or restarted.

The unlock code can be configured to control access to the computing device 120, content or applications stored on the computing device 120, configuration parameters associated with the computing device 120 and/or applications stored on the computing device 120, and/or a predetermined privilege level of one or more predetermined privilege levels associated with operating the computing device 120 and/or one or more applications stored on the computing device 120 or access over a network connection. The authentication unit 362 can be configured to transition the computing device 120 from a locked state in which the computing device 120 is not receptive to user inputs to an unlocked state in which the computing device 120 is receptive to user inputs.

The authentication unit 362 can be configured to unlock access to an application, a file, or other content stored on the authentication unit 362. The authentication unit 362 can also be configured to decrypt an encrypted file responsive to the correct predetermined pattern of movement associated with the file being performed by the user of the computing device 120. The authentication unit 362 can also be configured to allow the execution of an application with which the predetermined pattern of movement is associated in order to control access to the application. The authentication unit 362 can also be configured to allow access to configuration files or data with which the predetermined pattern of movement is associated responsive to the predetermined pattern of movement being entered.

The authentication unit 362 can also be configured to download content to the device or to unlock the capability of the user to download content to the device responsive to the predetermined pattern of movement being entered. For example, the authentication unit 362 can be configured to unlock the ability or the user to access an application store or other content provider to download applications or other content to the device. The authentication unit 362 can also be configured to unlock access to paid content, such as paid downloads or in-application purchases responsive to the predetermined pattern of movement being entered or to services that can cost money. For example, the authentication unit 362 can be configured unlock access to use mobile data services on the device or to access paid or sensitive websites, such as dating websites or other services.

The authentication unit 362 can also be configured to unlock the ability for the user to access the ability to make payments or make purchases from the device. For example, the authentication unit 362 can be configured to unlock the ability to use the device to pay for purchase using a mobile payment and/or digital wallet service. The authentication unit 362 can also be configured to allow the user to access the pay services until the device is locked again or until a predetermined timeout period has elapsed.

The authentication unit 362 can be configured to operate the computing device 120 in a particular mode responsive to the unlock code being entered. For example, the authentication unit 362 can be configured to operate in a superuser or administrator mode where the user can access and configure aspects of the device that would not otherwise be available to a regular user. The computing device 120 can be configured to operate one of multiple modes each having permissions to access certain functions of the computing device 120, and each mode can be associated with a predetermined pattern of movement. The authentication unit 362 can be configured to switch from a first mode of operation to a second mode of operation responsive to the predetermined pattern of movement associated with the second mode of operation being entered. The different modes of operation can also be used to enable parental control or other similar modes of operation in which some users may be restricted from performing certain actions on the device. The authentication unit 362 can be configured such that the mode of the device can be changed by entering the appropriate predetermined pattern of movement or by entering a predetermined pattern of movement that unlocks a user interface that allows the mode of operation of the device to be changed.

The predetermined pattern of movement can be duress code and the authentication unit 362 can be configured to perform one or more actions responsive to the contact with the touchscreen matching the duress code. A duress code that can be used to indicate that the user of the computing device 120 is experiencing an emergency situation where some action should be taken, such as encrypting all or part of the contents of the computing device 120, deleting all or part of the contents of the computing device 120, backing up all or a part of the contents of the computing device 120 the cloud, and/or sending out a beacon broadcasting the location of the computing device 120. The duress code can be associated with one or more actions that proceed without any indication that the one or more actions are being performed. For example, the one or more predetermined actions associated with the duress code can be configured to cause the device to send a beacon broadcasting the location of the computing device 120, to contact emergency services, and/or to transmit audio and/or video content captured by the computing device 120. The authentication unit 362 can be configured to perform these and/or other actions responsive to a duress code being entered without providing an indication that the computing device 120 is taking such actions to avoid altering others who may be with the user of the computing device 120 that a request for assistance and/or other actions are being performed. The duress code can also be associated with a cancel code, which if entered, halts ongoing actions associated with the duress code and/or may reverse one or more of the actions performed in response to the duress code, such as restoring deleted content and/or decrypting encrypted content.

The preceding examples of the types of one or more predetermined actions that may be performed by the authentication unit 362 are intended to be illustrative, and are not an exhaustive list of the types of actions that the authentication unit 362 can be configured to perform. The authentication unit 362 can be configured to perform other types of actions in addition to or instead of the examples provided.

The data access unit 366 can be configured to store data in the memory 260 and/or other data storage devices associated with the device. The data access unit 366 can also be configured to access data in the memory 260 and/or other data storage devices associated with the device. The data access unit 366 can be configured to receive requests from other units and/or components of the device and to store and/or access data stored in the memory 260 and/or other data storage devices associated with the device.

Figure 9:
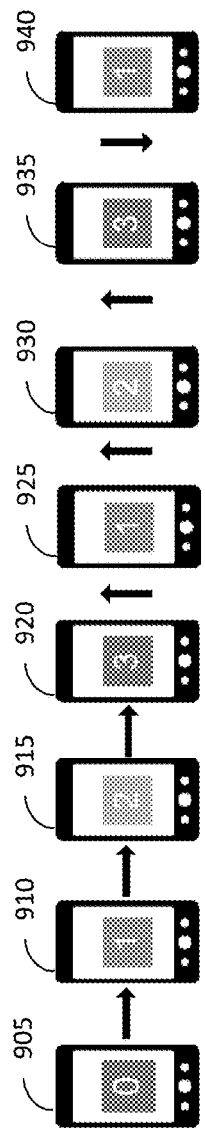
FIG. 9 is a block diagram illustrating a sequence of the types of movements included in a first example predetermined pattern of movement.
Figure 10:
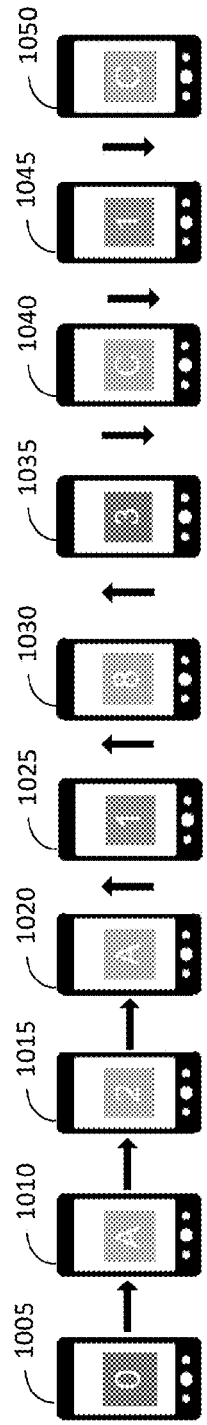
FIG. 10 is a block diagram illustrating a sequence of the types of movements included in a second example predetermined pattern of movement.
Figure 11:
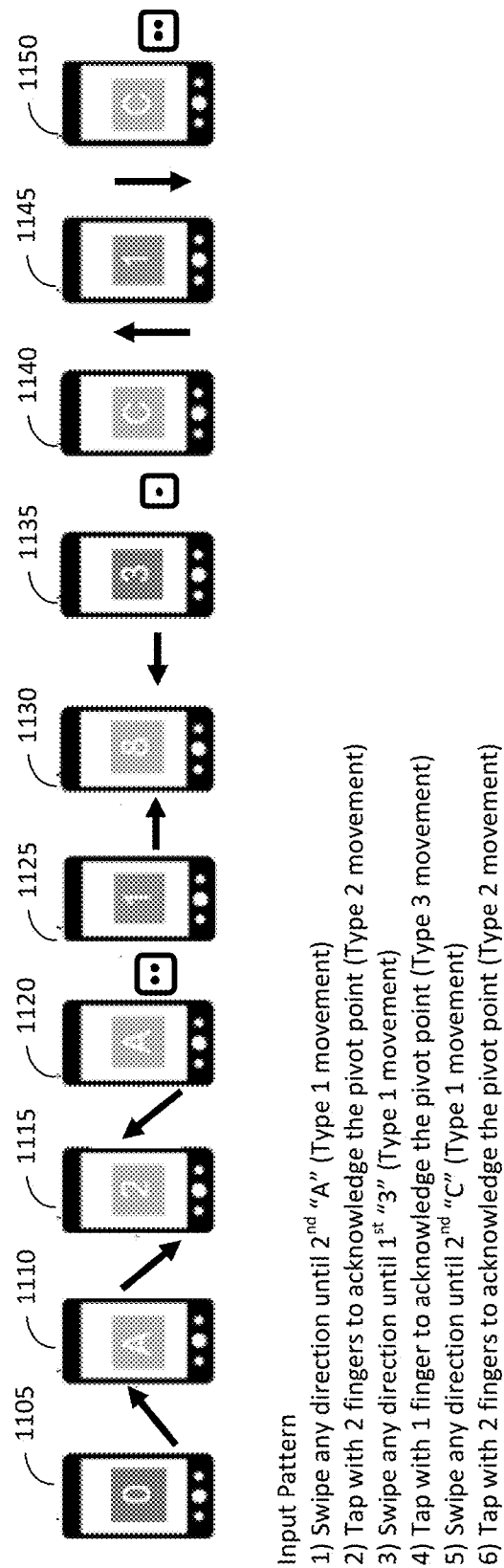
FIG. 11 is a block diagram illustrating a sequence of the types of movements included in a third example predetermined pattern of movement.

FIGS. 9, 10, and 11 provide examples illustrating the concepts of the techniques disclosed herein. FIG. 9 illustrates a first example predetermined pattern of movement, FIG. 10 illustrates a second example predetermined pattern of movement, and FIG. 11 illustrates a third example predetermined pattern of movement. The examples illustrated in FIGS. 9-11 are intended to illustrate the concepts discussed herein and are not intended to limit the predetermined patterns of movement that can be implemented using the techniques disclosed herein to these specific predetermined patterns of movement. The techniques used herein can include different types of movements, a different order of types of movements, and the types of movements can be repeated a different number of times. The types of indicia displayed and/or presented by the authentication unit 362 can also be different. The predetermined patterns of movement illustrated in FIGS. 9-11 can be used as an unlock code to unlock the computing device 120 or content stored on the computing device 120. The predetermined patterns of movement illustrated in FIGS. 9-11 can be used as duress code for triggering the computing device 120 to take one or more actions responsive to the duress code being entered. The examples illustrated in FIGS. 9-11 can also be used be used to perform one or more other types of predetermined actions and are not limited to the unlock code and duress code examples discussed herein. The authentication unit 362 can also provide an interface for capturing and recording the predetermined patterns of movements, such as those illustrated in FIGS. 9-11. The user does not need to maintain contact with the touchscreen throughout the entire process of entering the predetermined pattern of movement. The user can break contact with the screen between movements unlike conventional pattern lock codes which require the entire pattern to be entered in a single movement while maintaining contact with the screen of the device. Furthermore, the user does not need to watch the screen during entry of the predetermined pattern of movement. For example, where the predetermined pattern of movement is fixed and does not have variable components. The user need not look at the touchscreen of the computing device 120 while entering the predetermined pattern of movement. For example, the computing device 120 can be a smartphone or smartwatch, and the user can conceal the touchscreen of the device so that others cannot observe the predetermined pattern of movement being entered. For example, the user can put the smartphone in their pocket and enter the predetermined pattern of movement by touch.

The authentication unit 362 can be configured such that more than one type of pattern entry technique can be used simultaneously. For example, the authentication unit can be configured such that each of the techniques illustrated in FIGS. 9-11 or a combination thereof can be implemented by the authentication unit 362 on a computing device 120. The authentication unit 362 can be configured such that upon each input movement, the authentication unit 362 compares the input pattern to all patterns that have been registered with the computing device 120 and/or with a security account associated with the computing device 120. If a pattern match is detected, the authentication unit 362 can be configured to execute the one or more predetermined actions associated with that predetermined pattern of movement. Furthermore, the authentication unit 362 can be configured to allow the user of the computing device 120 to select a preferred approach for entering the predetermined patterns. To implement such an approach, the authentication unit 362 can be configured to associate more than one predetermined pattern of movements with one or more predetermined actions. The user can enter any of these predetermined patterns of movements in order to have the predetermined pattern of movements executed by the authentication unit 362. For example, the user of the computing device could create an unlock code, duress code, or other type of code that can use any of the three types of techniques illustrated in FIGS. 9-11, or a combination thereof. The user interface of the authentication unit 362 can be configured to allow the user to record multiple predetermined pattern of movement and to associate these predetermined patterns of movement with same one or more predetermined actions responsive to any of the predetermined patterns of movement specified being entered successfully.

The example predetermined pattern of movement illustrated in FIG. 9 includes a predetermined pattern of movement in which the number of times that a particular type of movement is to be repeated is fixed. The particular pattern includes movements in which the user is to swipe across at least a portion of the screen in a particular direction. The predetermined pattern of movement includes: (1) swiping from left to right three times, (2) swiping from bottom to top three times; (3) swiping from top to bottom one time. In order to successfully enter the predetermined pattern of movement, each of these movements must be performed in the order indicated and the correct number of times indicated. If an incorrect movement is entered, or a movement is repeated too many times, the authentication unit 362 can be configured to determine that the pattern has not been entered correctly, and can be configured to begin monitoring for the entry of the predetermined pattern of movement from the beginning or another predetermined pattern of movement if multiple predetermined patterns of movement are in use on the computing device 120.

The example predetermined pattern of movement illustrated in FIG. 9 includes eight stages: 905, 910, 915, 920, 925, 930, 935, and 940. At stage 905, the authentication unit 362 of the computing device 120 is waiting for contact to be made with the touchscreen of the computing device 120 to be made and a predetermined type of movement to be entered. In this example, the authentication unit 362 can be configured to display an indicator on the touchscreen of the computing device 120 that indicates how many times that a particular type of movement has been entered. At stage 905, nothing has been entered. The device may have been awoken from a locked state, the user may have attempted to access content that has been locked using a locked code, the user may have launched an interface that triggers the computing device 120 to display a code entry interface, the user may have selected a reset option to reset the code entry upon entering an incorrect unlock or duress code, or some other action may have been taken to cause the authentication unit 362 to proceed to the start state for code entry. An authorized user who knows the unlock code may then swipe from left to right on the touchscreen once to reach stage 910. The authentication unit 362 can be configured update the indicia that is being displayed or presented to indicate that a movement was entered once. The user can then proceed to swipe from left to right again to reach stage 915 and swipe left to right again to reach stage 920. The authentication unit 362 can be configured to update the indicia being displayed and/or presented to the user of the computing device 120. In the example illustrated in FIG. 9 the indicia includes a counter that is displayed each time that a movement is sequentially entered in a particular direction. If the user had deviated from the predetermined pattern of movement and, for example, swiped from bottom to top, left to right, or top to bottom after stage 915, the authentication unit 362 could have update the indicia that is displayed and/or presented to indicate that that movement had been performed one time.

At stage 920, the user has correctly entered the first part of the predetermined pattern of movement correctly by swiping from left to right three times. The user has now reached a pivot point in the predetermined pattern of movement where the user must now switch from a first type of movement, in this example swiping from left to right, to a second type of movement, which in this example is swiping from bottom to top. The authentication unit 362 can be configured to provide no audio, visual, or haptic feedback that the user has reached the pivot point in the predetermined pattern of movement, which could be used by an unauthorized user to deduce the predetermined pattern of movement. The audio, visual, and/or haptic indicia provided by the authentication unit 362 in this example can be used to keep track of how many times that a particular movement has been entered by the user, but not whether the movements entered are correct. At stage 920, the user can begin swiping from top to bottom. The predetermined pattern of movement includes this type of movement being performed three times. The user swipes from top to bottom one more time to move from stage 920 to stage 925 and again to move from stage 925 to stage 930. The second pivot point in the predetermined pattern of movement is then reached where the user must switch from the second type of movement, which is swiping from bottom to top, to a third type of movement, which is swiping from top to bottom. The user swipes from top to bottom to move from stage 935 to stage 940. At stage 940, the predetermined pattern of movement has been completely entered successfully, and the authentication unit 362 can be configured to perform an unlock action or one or more other predetermined actions responsive to the predetermined pattern of movement having been entered successfully by the user. The authentication unit 362 can be configured to provide audio, visual, and/or haptic feedback to indicate that the predetermined pattern of movement has been entered successfully by the user prior to performing the unlock action or one or more other predetermined actions.

The example predetermined pattern of movement illustrated in FIG. 10 includes a predetermined pattern of movement in which the number of times that a particular type of movement is to be repeated is variable. Accordingly, the authentication unit 362 provides one or more indicia, which can be audio, visual, and/or haptic indicia that alert the user that a pivot point in the predetermined pattern of movement has been reached. The indicia displayed or provided by the authentication unit 362 are interspersed with other "false" indicia that are not indicative of a pivot point. An authorized user will have advance knowledge of the types of movements that are included in the predetermined pattern of movement and the indicia that indicate when a pivot point is reached and the next type of movement in the sequence is reached. The example predetermined pattern of movement illustrated in FIG. 10 includes ten stages: 1005, 1010, 1015, 1020, 1025, 1030, 1035, 1040, 1045, and 1050 based on the sequence of indicia that were displayed. The number of stages required to complete a predetermined pattern of movement that is variable will depend on the number of times that each of the movements is to be performed this time that the predetermined pattern of movement is to be entered. Accordingly, the number of stages required to enter the same sequence could be more or less than the ten stages in the example of FIG. 10 when the same predetermined pattern of movements is to be entered in the future.

At stage 1005, the authentication unit 362 of the computing device 120 is waiting for contact to be made with the touchscreen of the computing device 120 to be made and a predetermined type of movement to be entered similar to the example illustrated in FIG. 9. The authentication unit 362 can also be configured to start the sequence over again at stage 1005 should the user enter an incorrect sequence of movements, and new false indicia can be displayed instead of the number zero displayed in the example of FIG. 10. The authentication unit 362 can change the false indicia each time the sequence is entered to avoid providing an unauthorized user with clues that can be used to deduce the sequence. The example predetermined pattern of movement in FIG. 10 includes: (1) swiping from left to right until a second letter "A" is displayed, (2) swiping from bottom to top until a first number "3" is displayed; (3) swiping from top to bottom until a second letter "C" is displayed. In order to successfully enter the predetermined pattern of movement, each of these movements must be performed in the order indicated and the correct number of times until the proper indicia is displayed indicating that the pivot points have been reached. In the example illustrated in FIG. 10, the user must continue swiping from left to right until the second letter "A" appears. Accordingly, the user would swipe left to right four three time: once to move from stage 1005 to 1010, once to move from stage 1010 to stage 1015, and finally one more time to move from stage 1015 to stage 1020 to reach the first pivot point in the predetermined pattern of movement. The user will have advance knowledge that the second letter "A" serves as the pivot point indicating that the user should switch from the first type of movement, which is swiping from left to right, to the second type of movement, which is swiping from bottom to top. The user then swipes from bottom to top until the first number "3" is reached. In this example, the user swipes from bottom to top three times to reach the pivot point: once to move from stage 1025 to 1030, once to move from stage 1030 to stage 1025, and once more to move from stage 1030 to stage 1035 where the second pivot point is reached. The user will have advance knowledge that the first number "3" serves as the pivot point indicating that the user should switch from the second type of movement, which is swiping from bottom to top, to the third type of movement, which is swiping from top to bottom. The user then swipes from top to bottom until the second letter "C" is reached. In this example, the user swipes from top to bottom three times to reach the end of the predetermine pattern of movement from the second pivot point: once to move from stage 1035 to 1040, once to move from stage 1040 to stage 1030, and once more to move from stage 1035 to stage 1030 where the end of the predetermined pattern of movement is reached. At stage 1050, the predetermined pattern of movement has been completely entered successfully, and the authentication unit 362 can be configured to perform an unlock action or one or more other predetermined actions responsive to the predetermined pattern of movement having been entered successfully by the user. The authentication unit 362 can be configured to provide audio, visual, and/or haptic feedback to indicate that the predetermined pattern of movement has been entered successfully by the user prior to performing the unlock action or one or more other predetermined actions.

The example predetermined pattern of movement illustrated in FIG. 11 includes a predetermined pattern of movement in which the number of times that a particular type of movement is to be repeated is variable and the types of movements included in the predetermined pattern of movement are not fixed. In technique illustrated in FIG. 11 like the technique illustrated in FIG. 10, the authentication unit 362 provides one or more indicia, which can be audio, visual, and/or haptic indicia that alert the user that a pivot point in the predetermined pattern of movement has been reached. The indicia displayed or provided by the authentication unit 362 are interspersed with other "false" indicia that are not indicative of a pivot point. What differs between the technique illustrated in FIG. 11 and the technique illustrated in FIG. 10 is that the predetermined pattern of movement can optionally not require specific types of movements before, after, or between the pivot points. The authentication unit 362 can be configured to provide an interface that illustrates the sequence of predetermined movements divided into segments at the pivot points and the one or more indicia associated with each pivot point. The interface can allow the user to select a segment and to indicate whether a particular type of movement is to be required at that segment and can specify that movement or can indicate that the segment does not require any specific type of movement. For segments that do not require any specific type of movement, the user can input any type of movement and the authentication unit 362 can be configured to update the one or more dynamically updated indicia responsive to each movement. When the one or more indicia associated with a pivot point are reached, the authentication unit 362 can be configured to monitor the contact with the touchscreen to determine whether a specific type of movement identified. In the example illustrated in FIG. 11, the authentication unit 362 is configured to look for a tap or a sequence of taps from the user to indicate that the user has recognized that the pivot point has been reached. The authentication unit 362 can be configured to utilize other types of movements in addition to or instead of using a sequence of taps.

The example illustrated in FIG. 11 illustrates a predetermined pattern of movement where none of the segments have fixed types of movements associated with them. Accordingly, the user can make any type of recognized movement to cause the authentication unit 362 to move on to a next dynamically updated indicia, but the user must in this example confirms the appearance of the one or more indicia associated with a pivot point with a one-fingered or two-fingered tap on the touchscreen of the computing device 120. The example predetermined pattern of movement illustrated in FIG. 11 includes ten stages: 1105, 1110, 1115, 1120, 1125, 1130, 1135, 1140, 1145, and 1150 based on the sequence of indicia that were displayed. The number of stages required to complete a predetermined pattern of movement that is variable will depend on how many pivot points are included in the predetermined pattern of movement, whether any sequences have a fixed type of movement and/or number of repetitions of that movement, and how many false indicia the authentication unit 362 displays between pivot points for which there is not a set type of movement or for which there is not a set number of repetitions for a particular type of movement. Accordingly, the number of stages required to enter the same sequence could be more or less than the ten stages in the example of FIG. 11 when the same predetermined pattern of movement is to be entered in the future.

The example predetermined pattern of movement in FIG. 11 includes: (1) swiping in any direction or other input gesture until a second letter "A" is displayed, (2) tap with 2 fingers to acknowledge the pivot point has been reached, (3) swiping in any direction or other input gesture until a first number "3" is displayed, (4) tap with 1 finger to acknowledge the pivot point has been reached, (5) swiping in any direction or other input gesture until a second letter "C" is displayed, and (6) tap with 2 fingers to acknowledge the pivot point has been reached. The example sequence begins with stage 1105. The user can swipe in any direction or use any other input gesture that is not reserved to indicate that a pivot point has been reached to advance through stages 1110, 1115, and 1120 to reach the first pivot point. The user can then use a two-fingered tap gesture to indicate that the first pivot point has been reached. The authentication unit 362 will recognize that the user has correctly identified the pivot point and will continue to stage 1125. The user can once again proceed through stages 1130 and 1135 by swiping in any direction or using any other input gesture that is not reserved to indicate that a pivot point has been reached. The user can then use a one-fingered tap gesture to indicate that the second pivot point has been reached. The authentication unit 362 will recognize that the user has correctly identified the second pivot point and will continue to stage 1140. The user can swipe in any direction or use any other input gesture that is not reserved to indicate that a pivot point has been reached to advance through stages 1145 and 1150 to reach the third and final pivot point in this example. The user can then use a two-fingered tap gesture to indicate that the third pivot point has been reached. The authentication unit 362 will recognize that the user has entered the predetermined pattern of movement correctly and perform the one or more predetermined actions associated with that predetermined pattern of movement. If an pivot point is not identified correctly, the authentication unit 362 can be configured to determine that the pattern has not been entered correctly, and can be configured to begin monitoring for the entry of the predetermined pattern of movement from the beginning or another predetermined pattern of movement if multiple predetermined patterns of movement are in use on the computing device 120.

The example predetermined patterns of movement illustrated in FIGS. 9-11 have been provided to illustrate how fixed and variable predetermined patterns of movements can be used. The types of movements that can be included in a predetermined pattern, the order of such types of movements, and the number of times that such movements are to be performed can vary from the examples disclosed herein. Other types of movements, such as the rotation of a shape displayed on the mobile device can be used, circular movements, and/or diagonal movements can also be included in a predetermined pattern of movement.

Furthermore, the number of pivot points included in the predetermined pattern of movement can be more or less than the number of pivot points included in the examples discussed herein. The authentication unit 362 can be configured to display or present at least one dynamically updated indicator comprises one or more of a color, pattern, letter, shape, number, sound, haptic feedback, or other indicator known to an authorized user of the computing device 120. Furthermore, the indicia displayed and/or presented by the authentication unit 362 are not limited to the examples provided in FIGS. 9-11. Furthermore, in some implementations using fixed predetermined patterns of movement, the authentication unit 362 can be configured to display or present no indicia to the user of the computing device 120. In such implementations, the user can enter the predetermined pattern of movement and the computing device 120 can execute one or more predetermined actions associated with the predetermined pattern of movement upon successful entry of the pattern. Such an approach provides no feedback to an unauthorized user, and someone looking over the shoulder of an unauthorized user of the computing device 120 would have no express indications of where the pivot points in the predetermined pattern of movement are located.

Figures 4, 5:
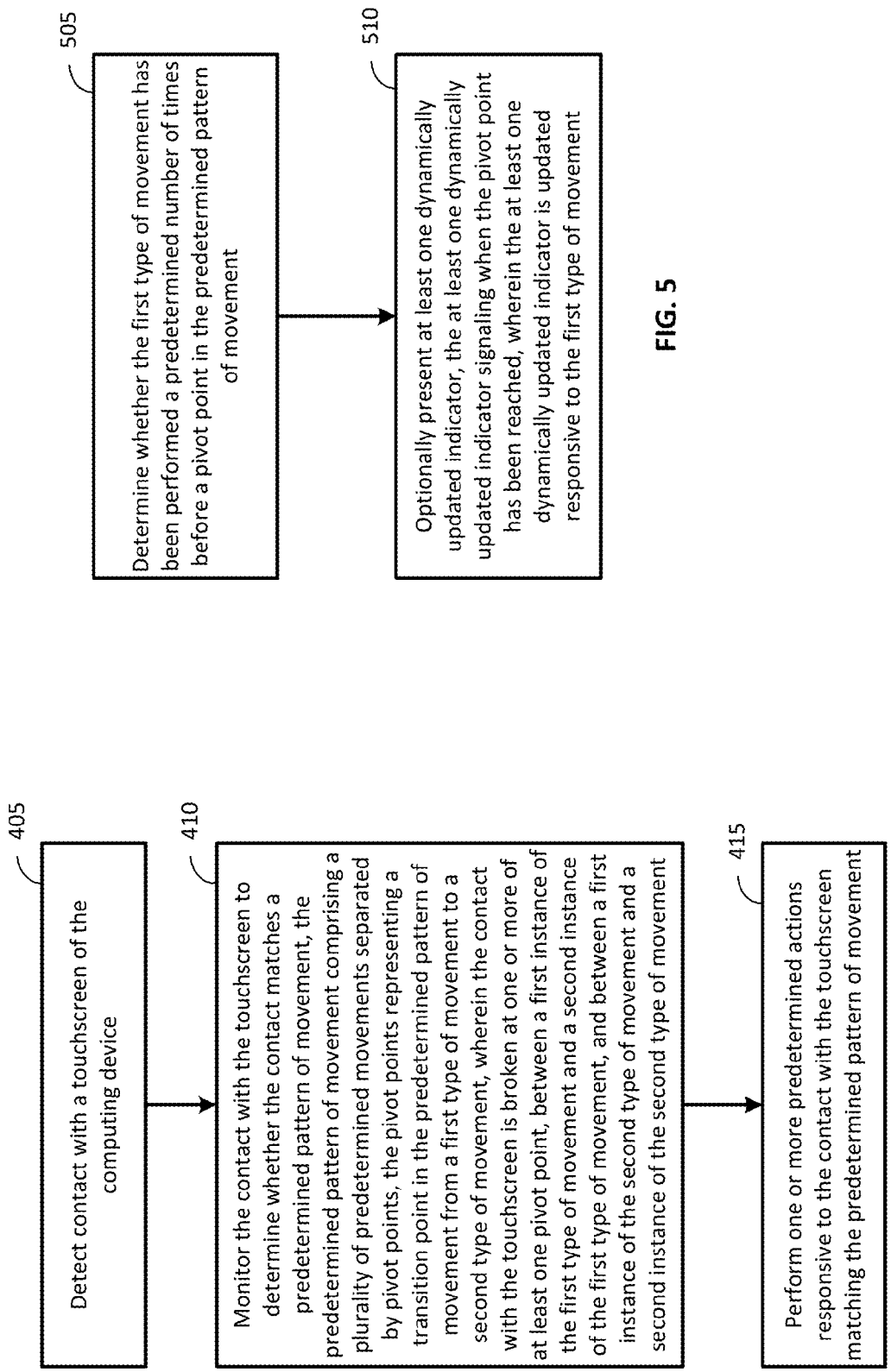
FIG. 4 is a flow diagram of an example process for securing a computing device according to the techniques discussed herein.
FIG. 5 is a flow diagram of an example process for determining whether a predetermined pattern of movement has been detected according to the techniques discussed herein.

FIG. 4 is a flow diagram of an example process for securing a computing device according to the techniques discussed herein. The process illustrated in FIG. 4 can be implemented using the computing device 120 illustrated in FIGS. 1-3, unless otherwise specified. The authentication unit 362 of the computing device 120 can provide means for performing the various stages of the process illustrated in FIG. 4 unless otherwise specified.

Contact with the touchscreen of the computing device 120 can be detected (stage 405). The authentication unit 362 can be configured to receive signals from the touchscreen of the computing device 120 and to detect contact with the computing device 120 based on the signals received from the touchscreen. The touchscreen can be configured to generate a signal in response a user of the computing device 120 by touching a position on the surface of the touchscreen using a fingertip, a stylus, or other input device. The signal information can identify a position on the touchscreen at which the touch occurred. The touchscreen can be configured to detect multiple points of contact and to output a signal that indicates that multiple points of contact have been made with the touchscreen. Touchscreens that support multiple simultaneous points of contact can facilitate the use of "multi-touch" gestures in which multiple points of contact are used to generate an input that can be translated into a requested action by the authentication unit 362 and/or other components of the computing device 120.

The contact with the touchscreen can be monitored to determine whether the contact matches a predetermined pattern of movement (stage 410). The predetermined pattern of movement can comprise a plurality of predetermined movements separated by pivot points, the pivot points representing a transition point in the predetermined pattern of movement from a first type of movement to a second type of movement. The contact with the touchscreen need not be maintained between the each of the predetermined movements. The contact with the touchscreen can be broken at one or more of at least one pivot point, between a first instance of the first type of movement and a second instance of the first type of movement, or between a first instance of the second type of movement and a second instance of the second type of movement. The contact with the touchscreen can be broken at another point in the predetermined pattern of movement as in addition or instead of the preceding examples. The predetermined pattern of movement can be used to restrict access to certain functions of the computing device 120. The predetermined pattern of movement can be used as an unlock code that can be used to unlock the computing device 120 where the computing device 120 is in a locked state. The predetermined pattern of movement can also be used as an unlock code for accessing content on the computing device 120. For example, the authentication unit 362 can be configured to encrypt the contents of a file on the computing device 120 and the predetermined pattern of movement can serve as a key that can be used to decrypt the contents of the file. The predetermined pattern of movement can also be used as a key to access an application or other executable content on the computing device 120. For example, a parent could lock an application using the predetermined pattern of movement as a key to prevent a child from accessing that application on the computing device 120. A computer administrator could also lock access to configuration tools or configuration files on the computing device 120 using the predetermined pattern of movement as a key which can be used to unlock the tools or configuration files. The examples provided herein are just some examples of how a predetermined pattern of movement can be used to lock the computing device 120 and/or the content stored therein and are not intended to limit the techniques disclosed herein to these specific examples. The authentication unit 362 can be configured to provide a user interface that prompts the user to enter the unlock code. For example, the authentication unit 362 can be configured to present a user interface prompting a user to enter an unlock code responsive to a user input while the computing device 120 is in a locked state. The authentication unit 362 can be configured to display a user interface prompting the user to enter an unlock code in response to the user attempting to execute an application that is locked with an unlock code or to access a file or other content locked with an unlock code.

As discussed above with respect to FIGS. 9-11 the predetermined pattern of movement can be entered by a user of the computing device 120 by manipulating a shape displayed on the touchscreen of the computing device 120 or can be entered without any visual feedback provided by the user of the computing device 120. The predetermined pattern of movement includes at least a first type of movement and a second type of movement separated by at least one pivot point, and each type of movement may repeated more than one time in the predetermined pattern of movement. The number of time that a particular movement is to be repeated can be fixed or variable. In instances where the number of times that a particular movement is to be repeated is fixed, the pattern of movement can be entirely predetermined and known in advance to the user entering the pattern. In instances where the number of times that a particular movement is to be repeated is variable, the types of movements to be included the predetermined pattern of movement can be known in advance to the user entering the pattern, but the number of times that each of the types of movements is not known in advance. Instead, the authentication unit 362 can be configured to provide at least one dynamically updated indicator that indicates to the user that the pivot point has been reached. The at least one dynamically updated indicator can be one or more of a color, letter, shape, number, sound, haptic feedback, or other indicator known to the user in advance of entering the predetermined pattern of movement. The security of the predetermined pattern of movement can be increased by adding the variable number of repetitions of one or more of the types of movement included in the predetermined pattern of movement to make gaining unauthorized access to the device, file, application, or other content that is protected using the predetermined pattern of movement as a key.

The following examples illustrate the concept of the predetermined pattern of movement having a fixed number of repetitions of each movement versus a variable number of repetitions for one or more of the types of movement included in the predetermined pattern of movement.

A first example predetermined pattern of movement requires that the user rotate a shape clockwise three times (the first type of movement) followed by rotating the shape top to bottom two times (the second type of movement). The number of times that each of the types of movements be performed has been predetermined at the time that the pattern was created by the authentication unit 362 or recorded by the user. The pivot point represents the point at which the change from the first type of movement to the second type of movement. In this example, the pivot point occurs after the shape has been rotated clockwise three times. The user must then rotate the shape from bottom to top as the next type of contact detected by the authentication unit 362. Otherwise, the authentication unit 362 will determine that the contact being monitored did not match the predetermined pattern of movement.

A second example predetermined pattern of movement requires that the user rotate a shape clockwise a first variable number of time times (the first type of movement) followed by rotating the shape top to bottom a second variable number of times (the second type of movement). The number of times that each of the types of movements be performed can be determined by the authentication unit 362 using a random or pseudorandom algorithm. The authentication unit 362 can be configured to keep the number of repetitions of each type of within a predetermined range of values, such as but not limited to 1 to 10 times, to avoid unduly burdening an authorized user with an extremely long predetermined pattern of movement while still avoiding a code that is too short and may be susceptible to attack. The number of times that each of the types of movements must be performed in order to match the predetermined pattern of movement is not known in advance by the user. Instead, the authentication unit 362 can be configured to display dynamically updated indicia on the touchscreen that update each time an input motion is detected whether the input is the expected type of movement or an erroneous type of movement. The authentication unit 362 can be configured to display a first known indicia or to provide a known audible or haptic feedback when the user has performed the first type of movement the required number of times to signal to the user that the user should proceed to the second type of movement. The authentication unit 362 can be configured to display a second known indicia when the second type of movement has been performed the required number of times or may proceed to stage 415 without providing additional feedback.

The following expands on the example having a predetermined pattern of movement that requires that the user rotate a shape clockwise a first variable number of time times (the first type of movement) followed by rotating the shape top to bottom a second variable number of times (the second type of movement) to illustrate the concept of the dynamically updated indicia. The authentication unit 362 can be configured display a blue letter 'A' as the indicator that the pivot point has been reached once the user has rotated the shape clockwise the required number of times. The authentication unit can be configured to display an orange number '6' as the indicator that the user has rotated the shape from top to bottom the required number of times. An authorized user would be provided these indicia in advance so that the user would be able to enter the predetermined pattern of movement without having advance knowledge of the number of times that each type of movement in the pattern is to be performed. The authentication unit 362 can be configured to use a random function or a pseudorandom function to select an indicator or indicia to be displayed or presented for each movement entered by the user that is not a pivot point. The authentication unit 362 can be configured to such that the indicator or indicia to be displayed or presented at the non-pivot points will be different from that to be displayed at the pivot point to avoid confusing the user entering the predetermined pattern but should be selected such that the indicia displayed or otherwise presented at the non-pivot points does not provide clues that could assist an unauthorized user from discovering the predetermined pattern of movement by distinguishing between pivot points and non-pivot points in the predetermined pattern of movement. The authentication unit 362 can be configured to present haptic feedback and/or audio feedback in addition to the visual feedback. For example, the authentication unit 362 can be configured to produce patterns of haptic feedback and/or audio signals that can included as part of the predetermined pattern of movement and which would be known to the authorized user in advance, so that the authorized user would understand the combination of visual, haptic, and/or audio indicia that signal when a pivot point has been reached.

One or more predetermined actions can be performed responsive to the contact with the touchscreen matching the predetermined pattern of movement (stage 415). The one or more predetermined actions can be performed responsive to the user correctly entering the predetermined pattern of movement. As discussed above, the authentication unit 362 can be configured to recognize more than one predetermined pattern of movement, and can be configured to perform the one or more predetermine actions associated with the particular predetermined pattern of movement that has been entered. Examples illustrating some example of the types of predetermined actions that can be performed by the authentication unit 362 are discussed above with respect to the authentication unit 362 and FIG. 3.

The authentication unit 362 can be configured such that if the sequence of movements included in the predetermined sequence of movements is not entered correctly, the authentication unit 362 can be configured to restart the process of matching the contact with the touchscreen detected with the predetermined pattern of movement. The authentication unit 362 can be configured such that the authentication unit 362 does not provide any feedback if the user makes a mistake while entering the predetermined pattern of movement to avoid providing unauthorized users of the computing device 120 with feedback that could be used to crack the pattern.

FIG. 5 is a flow diagram of an example process for determining whether a predetermined pattern of movement has been detected according to the techniques discussed herein. The process illustrated in FIG. 4 can be implemented using the computing device 120 illustrated in FIGS. 1-3, unless otherwise specified. The authentication unit 362 of the computing device 120 can provide means for performing the various stages of the process illustrated in FIG. 4 unless otherwise specified. The process illustrated in FIG. 5 can be used to implement a portion of stage 410 of the process illustrated in FIG. 4. The process illustrated in FIG. 5 refers to the first type of movement, but can be used by the authentication unit 362 to determine whether a fixed number of other types of movements within a predetermined pattern of movement (e.g., a second type of movement, third type of movement, etc.) have been performed such that a pivot point has been reached in the predetermined pattern of movement.

A determination whether the first type of movement has been performed a predetermined number of times before a pivot point in the predetermined pattern of movement can be made (stage 505). As discussed above, the number of times that a particular type of movement included in the predetermined pattern of movement can be fixed and an authorized user will have either defined how many times that each type of movement will be performed as part of the predetermined pattern of movement or have been provided the number of types that each of type of movement will be performed as determined by the authentication unit 362. The authentication unit 362 can be configured to keep a running count of how many times that the user has completed a particular movement, such as the first type of movement, and to determine whether the pivot point has been reached between a the first type of movement and the second type of movement included in the predetermined pattern of movement. If the authentication unit 362 determines that the user has performed the first type of movement the predetermined number of times, the authentication unit 362 can determine that the pivot point has been reached and can monitor contact with the touchscreen to determine for a second type of movement included in the predetermined pattern. If the authentication unit 362 determines that the user has not yet performed the first type of movement the predetermined number of times, the authentication unit 362 can be configured to wait for a predetermined timeout period to allow the user to continue entering the first type of movement. The user may have been temporarily interrupted while entering the predetermined pattern of movement, and the user need to maintain continuous contact with the touchscreen while entering the predetermined pattern of movement. Thus, it is possible that there may be slight interruptions in contact while the user is entering the predetermined pattern of movement. Furthermore, the authentication unit 362 can be configured to determine that the user has not performed the first type of movement the predetermined number of times if the timeout period elapses without further input, the user performs the first type of movement a number of times that exceeds the predetermined number of times associated with the predetermined pattern of movement, or the user proceeds to enter a different type of movement before reaching the pivot point. The authentication unit 362 can be configured to continue monitoring for contact with the touchscreen and determining whether the contact matches from the predetermined pattern of movement once again starting from the beginning of the predetermined pattern of movement.

At least one dynamically updated indicator can optionally be presented (stage 510). In some implementations, the authentication unit 362 can be configured to present at least one dynamically updated indicator. The at least one dynamically updated indicator signals when the pivot point has been reached and can be updated indicator is updated responsive to the first type of movement. As discussed above, the authentication unit 362 can be configured to display or present one or more indicia indicating that a pivot point in the predetermined pattern of movement has been reached. The authentication unit 362 can be configured to display a first known indicia or to provide a known audible or haptic feedback when the user has performed the first type of movement the required number of times to signal to the user that the user should proceed to the second type of movement. The authentication unit 362 can be configured to display a second known indicia when the second type of movement has been performed the required number of times or may proceed to stage 415 without providing additional feedback. Each pivot point in a predetermined pattern of movement can be associated with a different set of one or more indicia or may be associated with the same one or more indicia. However, having a different set of one or more indicia associated with different pivot points can increase the complexity of the pattern and avoid providing information that an unauthorized user might use to guess the predetermined pattern of movement and/or to identify pivot points included therein. In some implementations, the pivot points can be identified with a set of more than one indicia or a combination thereof that can be used to identify a pivot point. The authentication unit 362 can be configured to select randomly from this set of indicia or combination thereof when the pivot point is reached. Varying the indicia or combination thereof used by the authentication unit 362 can help to prevent an unauthorized user observing the entry of the predetermined pattern of movement from guessing the predetermined pattern of movement and/or to identify pivot points included therein.

FIG. 6 is a flow diagram of an example process for capturing a predetermined pattern of movement according to the techniques discussed herein. The process illustrated in FIG. 6 can be implemented using the computing device 120 illustrated in FIGS. 1-3, unless otherwise specified. The authentication unit 362 of the computing device 120 can provide means for performing the various stages of the process illustrated in FIG. 6 unless otherwise specified. The process illustrated in FIG. 6 can be used to record a predetermined pattern of movement that can be used with the techniques discussed herein. The process illustrated in FIG. 4 can be performed as additional stages to the process illustrated in FIG. 4.

Movements of an authorized user of the computing device 120 can be recorded while operating in a record pattern mode to generate the predetermined pattern of movement (stage 605). The authentication unit 362 can be configured to provide a user interface that can be used to enter a record mode in which the user can record a predetermined pattern of movement. The user interface can include a playback mechanism that allows the user to play back the predetermined pattern of movement to verify that the recorded pattern of movement matches what the user intended to be the predetermined pattern of movement. The user interface of the authentication unit 362 can be configured to be displayed from an application running on the computing device 120 that allows the user to associate an unlock code comprising a predetermined pattern of movement with application content. The user interface of the authentication unit 362 can be configured to be displayed from a device configuration menu that allows for a unlock code comprising a predetermined pattern of movement with application content to be defined for unlocking the computing device 120 when then computing device 120 is in a locked state.

The predetermined number of times that the each type of movement is to be performed based on the movements of the authorized user can be determined (stage 610). The user interface provided by the authentication unit 362 can be configured to allow the user to select whether the number of time that a particular type of movement included in the predetermined pattern of movement is to be fixed or variable.

The authentication unit 362 can be configured to record the predetermined pattern of movement as entered by the user if the user indicates that the pattern is of the "fixed" type. The authentication unit 362 unit records the pattern as entered by the user and keeps track of how many times each type of movement is performed by the user. The authentication unit 362 can later use this information to determine whether the predetermined pattern of movement has been entered correctly.

The authentication unit 362 can be configured to record the sequence of the types of movements included in the predetermined pattern of movement as entered by the user but not how many times each of these movements were performed if the user indicates that the pattern is of the "variable" type. The user interface provided by the authentication unit 362 can be configured to prompt the user for an indicator that is to be displayed or presented when each pivot point in the predetermined pattern of movement is reached. The authentication unit 362 can be configured to allow the user to select one or more indicia to be displayed or presented at each pivot point in the predetermined pattern of movement or the authentication unit 362 can be configured to select the one or more indicia to be displayed or presented at each pivot point and present those selections to the user. The authentication unit 362 is configured to use the one or more indicia associated with each pivot point to prompt the user that a pivot point has been reached and that a change in the type of movement to be input should be undertaken at this point.

The predetermined pattern of movement can be associated with one or more actions to be performed responsive to the predetermined pattern of movement being detected (stage 615). The authentication unit 362 can be configured to provide a user interface that allows for one or more actions to be performed responsive to the predetermined pattern of movement being detected by the authentication unit 362. Examples of types of actions that can be performed responsive to the predetermined pattern of movement have been discussed throughout the application. However, the authentication unit 362 is not limited to these specific examples of types of actions that can be performed. The one or more actions can be dependent on the capabilities of the computing device 120 on which the one or more predetermined actions are to be performed. For example, hardware, software, and/or form factor constraints on the computing device 120 may prevent certain actions from being taken on some computing devices. Furthermore, the one or more actions to be performed can be associated with one or more location constraints the authentication unit 362 can use to determine which action or actions can be performed based on the location of the computing device 120. For example, referring back to the example discussed above, the predetermined pattern of movement can be associated with a first location, which is the home of the user of the computing device, and a second location, which is the workplace of the user of the computing device. The predetermined pattern of movement can be associated with unlocking the computing device 120 and opening a personal email application and a social media application when the user enters the predetermined pattern of movement and the computing device 120 is located at the home of the user, and the predetermined pattern of movement can be associated with unlocking the computing device 120 and opening a work-related email application and a calendar application when the computing device is located at the workplace of the user. The authentication unit 362 of the computing device can obtain location information for the computing device from one or more components of the computing device 120 and/or from the location server 160 as discussed above.

FIG. 7 is a flow diagram of an example process for determining whether a predetermined pattern of movement has been detected according to the techniques discussed herein. The process illustrated in FIG. 7 can be implemented using the computing device 120 illustrated in FIGS. 1-3, unless otherwise specified. The authentication unit 362 of the computing device 120 can provide means for performing the various stages of the process illustrated in FIG. 7 unless otherwise specified. The process illustrated in FIG. 7 can be used to display at least one dynamically updated indicator on the touchscreen of the computing device 120, to output at least one audible indicator, to output at least one haptic indicator, or a combination thereof. The process illustrated in FIG. 4 can be used to implement at least a portion of stage 410 of the process illustrated in FIG. 4. In contrast with the technique illustrated in FIG. 5, the number of times that each type of movement included in the predetermined pattern of movement is not predetermined and can vary each time that the predetermined pattern of movement is entered by a user. The authentication unit 362 uses at least one dynamically updated indicator to indicate when a pivot point has been reached in the predetermined pattern of movement. Each type of movement included in the predetermined pattern of movement should be repeated until at least one indicator associated with the pivot point is displayed or presented by the authentication unit 362, and the number of times that each type of movement included in the predetermined pattern of movement is to be repeated can vary each time that the predetermined pattern of movement is to be entered.

A determination whether the first type of movement has been performed a variable number of times before a pivot point in the predetermined pattern of movement can be determined (stage 705). The variable number of times can be determined by the authentication unit 362 responsive to detecting contact with the touchscreen based on signals received at the authentication unit 362 from the touchscreen. As discussed above, the number of times that a particular type of movement included in the predetermined pattern of movement can be variable. At least one dynamically updated indicator can be presented (stage 710). The at least one dynamically updated indicator signals when the pivot point has been reached and can be updated indicator is updated responsive to the first type of movement. As discussed above, the authentication unit 362 can be configured to display or present one or more indicia indicating that a pivot point in the predetermined pattern of movement has been reached. The process illustrated in FIG. 7 can continue with stage 705 and a next type of movement in the sequence of type of movements included in the predetermined pattern of movement.

Figure 8:
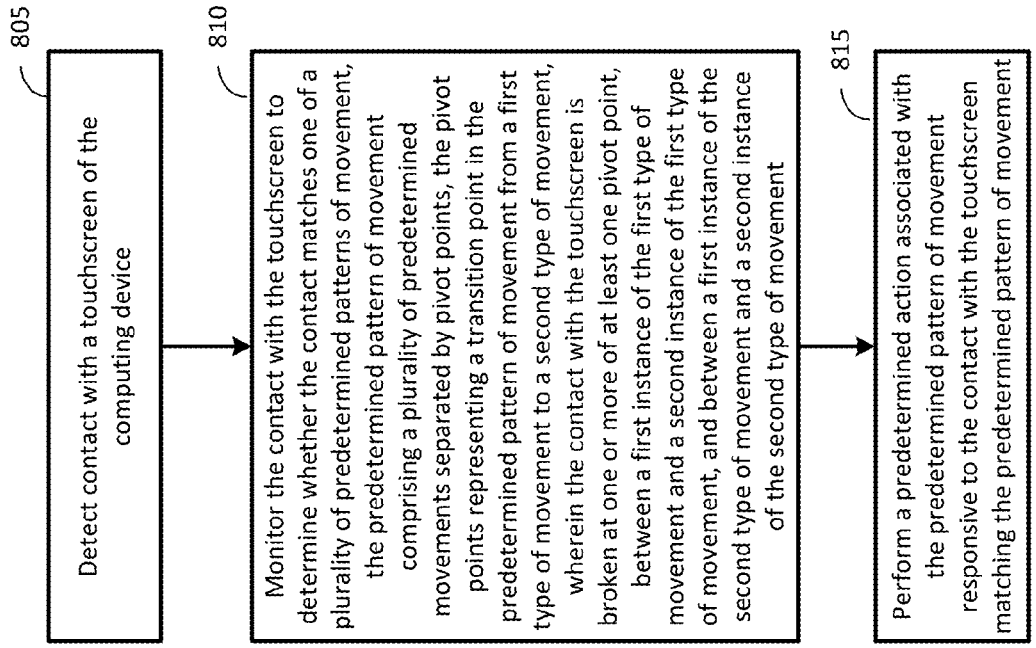
FIG. 8 is a flow diagram of an example process for capturing a predetermined pattern of movement according to the techniques discussed herein.

FIG. 8 is a flow diagram of an example process for capturing a predetermined pattern of movement according to the techniques discussed herein. The process illustrated in FIG. 8 can be implemented using the computing device 120 illustrated in FIGS. 1-3, unless otherwise specified. The authentication unit 362 of the computing device 120 can provide means for performing the various stages of the process illustrated in FIG. 8 unless otherwise specified. The process illustrated in FIG. 8 is similar to that illustrated in FIG. 4 except that the authentication unit 362 is configured to determine whether one of a plurality of predetermined patterns of movement have been detected.

Contact with the touchscreen of the computing device 120 can be detected (stage 805). Stage 805 is similar to stage 405 of the process illustrated in FIG. 4. The authentication unit 362 can be configured to receive signals from the touchscreen of the computing device 120 and to detect contact with the computing device 120 based on the signals received from the touchscreen. The touchscreen can be configured to generate a signal in response a user of the computing device 120 by touching a position on the surface of the touchscreen using a fingertip, a stylus, or other input device. The signal information can identify a position on the touchscreen at which the touch occurred. The touchscreen can be configured to detect multiple points of contact and to output a signal that indicates that multiple points of contact have been made with the touchscreen. Touchscreens that support multiple simultaneous points of contact can facilitate the use of "multi-touch" gestures in which multiple points of contact are used to generate an input that can be translated into a requested action by the authentication unit 362 and/or other components of the computing device 120.

The contact with the touchscreen can be monitored to determine whether the contact matches one of the plurality of predetermined patterns of movement (stage 810). Stage 810 is similar to stage 410 of the process illustrated in FIG. 4. The authentication unit 362 can be configured to recognize multiple predetermined patterns of movement, and each of the predetermined patterns of movement can be associated with a particular unlock action or actions. To illustrate this concept, a first predetermined pattern of movement can be associated with an unlock code for the computing device 120, a second predetermined pattern of movement can be associated with a duress code for the computing device 120, a third predetermined pattern of movement can be associated with a particular application on the computing device, and a fourth predetermined pattern of movement can be used to access configuration files of the computing device 120. These examples merely illustrate the concept that the authentication unit 362 can be configured to recognize multiple different predetermined patterns of movement that when entered can be used to perform some associated function such as unlocking the computing device 120 or content stored thereon. Different implementations may be configured to recognize different combinations of predetermined patterns of movement. As discussed above, a predetermined pattern of movement can comprise a plurality of predetermined movements separated by pivot points, the pivot points representing a transition point in the predetermined pattern of movement from a first type of movement to a second type of movement. The contact with the touchscreen need not be maintained between the each of the predetermined movements. The contact with the touchscreen can be broken at one or more of at least one pivot point, between a first instance of the first type of movement and a second instance of the first type of movement, or between a first instance of the second type of movement and a second instance of the second type of movement. The contact with the touchscreen can be broken at another point in the predetermined pattern of movement as in addition or instead of the preceding examples. The predetermined pattern of movement can be used to restrict access to certain functions of the computing device 120. The authentication unit 362 can be configured to provide a user interface that prompts the user to enter predetermined pattern of movement.

Perform an unlock action responsive to the contact with the touchscreen matching one of the plurality of the predetermined patterns of movement (stage 815). Stage 815 is similar to stage 415 of the process illustrated in FIG. 4. The authentication unit 362 can be configured to perform an unlock action associated with the matching one of the plurality of the predetermined patterns of movement. Like the example illustrated in FIG. 4, the authentication unit 362 can be configured to perform various types of unlock actions. The specific unlock action to be performed can be based on the predetermined pattern of movement that has been detect and the function.

The following example illustrates the multiple predetermined patterns of movement discussed in the process illustrated FIG. 5: a first predetermined pattern of movement is associated with an unlock code for the computing device 120 and a second predetermined pattern of movement is associated with a duress code for the computing device 120. The authentication unit 362 can be configured to transition the computing device 120 from a locked state in which the computing device 120 is not receptive to user inputs to an unlocked state in which the computing device 120 is receptive to user inputs responsive to detecting the first predetermined pattern of movement. The authentication unit 362 can be configured to perform a duress code related action responsive to detecting the second predetermined pattern of movement. For example, the authentication unit 362 can be configured to encrypt the contents of the computing device 120, to backup the contents of the computing device 120 to a remote server, to wipe the contents of the mobile device, to place a call or send a message for emergency assistance, and/or to transmit a beacon comprising location information for the computing device 120.

FIG. 12 is a flow diagram of an example process for capturing a predetermined pattern of movement for a first computing device using a second computing device according to the techniques discussed herein. The process illustrated in FIG. 12 can be implemented using the configuration computing device 180 illustrated in FIGS. 1-3, unless otherwise specified. The authentication unit 362 of the configuration computing device 180 can provide means for performing the various stages of the process illustrated in FIG. 12 unless otherwise specified. The process illustrated in FIG. 12 is similar to that illustrated in FIG. 6 except that the predetermined pattern of movement is captured by the configuration computing device 180 for use one or more other computing devices, such as the computing device 120.

Movements of a user of the configuration computing device 180 can be recorded while operating in a record pattern move to generate the predetermined pattern of movement (stage 1205). The authentication unit 362 of the configuration computing device 180 can be configured to provide a user interface that can be used to enter a record mode in which the user can record a predetermined pattern of movement similar to that which is discussed above with respect to stage 605 of the process illustrated in FIG. 6. The user interface can include a playback mechanism that allows the user to play back the predetermined pattern of movement to verify that the recorded pattern of movement matches what the user intended to be the predetermined pattern of movement. The user interface of the authentication unit 362 can be configured to be displayed from an application running on the configuration computing device 180 that allows the user to associate an unlock code comprising a predetermined pattern of movement with application content. The user interface of the authentication unit 362 can be configured to be displayed from a device configuration menu that allows for a unlock code comprising a predetermined pattern of movement with application content to be defined for unlocking the computing device 120 when then computing device 120 is in a locked state.

A number of times that the each type of movement is to be performed based on the movements of the authorized user can be determined (stage 1210). The user interface provided by the authentication unit 362 of the configuration computing device 180 can be configured to allow the user to select whether the number of time that a particular type of movement included in the predetermined pattern of movement is to be fixed or variable. The authentication unit 362 of the configuration computing device 180 can be configured to record fixed and/or variable patterns of movements in a similar fashion as discussed above with respect to stage 610 of FIG. 6.

The predetermined pattern of movement can be associated with one or more actions to be performed responsive to the predetermined pattern of movement being detected (stage 1215). The authentication unit 362 of the configuration computing device 180 can be configured to associate one or more actions to be performed in a similar fashion as discussed above with respect to stage 610 of FIG. 6. The authentication unit 362 of the configuration computing device 180 can be configured to provide a user interface that allows for one or more actions to be performed responsive to the predetermined pattern of movement being detected by the authentication unit 362 of the computing device 120 on which the pattern of predetermined movement is to be associated. Examples of types of actions that can be performed responsive to the predetermined pattern of movement have been discussed throughout the application. However, the authentication unit 362 is not limited to these specific examples of types of actions that can be performed. The one or more actions can be dependent on the capabilities of the computing device 120 on which the one or more predetermined actions are to be performed. As discussed above, hardware, software, and/or form factor constraints on the computing device 120 may prevent certain actions from being taken on some computing devices. Furthermore, the one or more actions to be performed can be associated with one or more location constraints the authentication unit 362 can use to determine which action or actions can be performed based on the location of the computing device 120.

The predetermined pattern of movement can be associated with one or more computing devices (stage 1220). The configuration computing device 180 can be configured to provider a user interface that allows a user of the configuration computing device 180 to specify which computing devices, such as computing device 120, a predetermined pattern of movement is to be associated. The user interface can also be configured to allow the user to associate some or all of the one or more actions to be performed with specific computing devices. Some of the computing devices may have different capabilities associated with the software, hardware, and/or form factor of the computing device. Accordingly, different actions may be associated with the predetermined pattern of movement for different devices based on the type of device. Furthermore, different computing devices may be associated with different roles. For example, a user may have one or computing devices for work and one or more for personal use. The user may also have one or more computing devices that may be used by family members. The user may also be responsible for administering more than one computing devices for an office, school, or other environment, and can select one or more actions appropriate for each computing device 120 based on the intended user of the computing device 120.

The information associated with the predetermined pattern of movement, the one or more actions associated with the predetermined pattern of movement, and the computing devices associated with the predetermined pattern of movement can be stored in the memory 260 of the configuration computing device 180. This information can also be uploaded to a security account associated with the configuration computing device 180 and/or the computing devices, such as computing device 120, with which the predetermined pattern of movement has been associated. The authentication unit 362 of the configuration computing device 180 can be configured to send this information the authentication unit 362 of the computing devices with which the pattern predetermined pattern of movement has been associated either directly or indirectly via wired or wireless connection.

The authentication unit 362 of the configuration computing device 180 can also be configured to provide an interface for testing a predetermined pattern of movement and the associated with a computing device 120. The authentication unit 362 of the configuration computing device 180 can be configured to send information associated with the predetermined pattern of movement and the one or more actions associated with the predetermined pattern of movement to a computing device 120 on which the predetermined pattern of movement is to be tested. The authentication unit 362 of the configuration computing device 180 can be configured to send this information the authentication unit 362 of the computing device 120 on which the pattern is to be tested via a direct or indirect, wired or wireless connection between the two devices. The authentication unit 362 of the configuration computing device 180 can be configured to send the information with a message instructing that the authentication unit 362 of the computing device 120 to enter a test mode for testing a predetermined pattern of movement. The authentication unit 362 of the computing device 120 can be configured to enter the test mode and to perform a process similar to that illustrated in FIG. 4. However, while in the test mode, the authentication unit 362 of the computing device 120 can be configured to substitute stage for stage 410 other steps for indicating whether the predetermined pattern of movement has been entered successfully. For example, the authentication unit 362 of the computing device 120 can be configured to display a message or other indicator on the screen of the computing device 120 indicating whether the predetermined pattern of movement was entered successfully on the computing device 120. The authentication unit 362 of the computing device 120 can be configured to send a message to the configuration computing device 180 indicating whether the predetermined pattern of movement was entered successfully on the computing device 120. The authentication unit 362 of the configuration computing device 180 can also be configured to provide an interface that allows for the predetermined pattern of movement to be deployed to the computing device 120 responsive to the test being successful or for canceling the deployment of the predetermined pattern of movement to be deployed to the computing device 120 responsive to the test being unsuccessful.

The methodologies described herein may be implemented by various means depending upon the application. For example, these methodologies may be implemented in hardware, firmware, software, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processor unit. Memory may be implemented within the processor unit or external to the processor unit. As used herein the term "memory" refers to any type of long term, short term, volatile, nonvolatile, or other memory and is not to be limited to any particular type of memory or number of memories, or type of media. Tangible media include one or more physical articles of machine readable media, such as random access memory, magnetic storage, optical storage media, and so on.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), and Blu-ray disc where disks usually reproduce data magnetically, while discs reproduce data optically with lasers. Combinations of the above should also be included within the scope of computer-readable media. Such media also provide examples of non-transitory media, which can be machine readable, and wherein computers are an example of a machine that can read from such non-transitory media.

The generic principles discussed herein may be applied to other implementations without departing from the spirit or scope of the disclosure or claims.

What is claimed is:

1. A method for securing a computing device, the method comprising:
   detecting contact with a touchscreen of the computing device;
   monitoring the contact with the touchscreen to determine whether the contact matches a predetermined pattern of movement, the predetermined pattern of movement comprising a plurality of predetermined movements separated by pivot points, the pivot points representing a transition point in the predetermined pattern of movement from a first type of movement to a second type of movement, wherein a number of times which the first type of movement, the second type of movement, or both are to be performed is variable, and wherein the contact with the touchscreen is broken at one or more of
   at least one pivot point,
   between a first instance of the first type of movement and a second instance of the first type of movement, or
   between a first instance of the second type of movement and a second instance of the second type of movement;
   presenting at least one indicator that is updated responsive to each movement and that provides a signal when a pivot point has been reached; and
   performing one or more predetermined actions responsive to the contact with the touchscreen matching the predetermined pattern of movement.

2. The method of claim 1, wherein monitoring the contact with the touchscreen to determine whether the contact matches the predetermined pattern of movement comprises determining whether the first type of movement has been performed a predetermined number of times before a pivot point in the predetermined pattern of movement.

3. The method of claim 2, further comprising:
   recording movements of an authorized user of the computing device while operating in a record pattern mode to generate the predetermined pattern of movement; and
   determining the predetermined number of times that the first type of movement is performed based on the movements of the authorized user.

4. The method of claim 1, wherein monitoring the contact with the touchscreen to determine whether the contact matches the predetermined pattern of movement comprises determining whether the first type of movement has been performed a variable number of times before a pivot point in the predetermined pattern of movement, the variable number of times being determined after detecting the contact with the touchscreen.

5. The method of claim 4, further comprising:
   determining the number of times that the first type of movement is to be performed before reaching the pivot point based on the predetermined pattern of movement.

6. The method of claim 1, wherein the at least indicator one comprises one or more of a color, letter, shape, number, sound, haptic feedback, or other indicator known to an authorized user of the computing device.

7. The method of claim 1, further comprising:
   monitoring the contact with the touchscreen to determine whether the contact matches a second predetermined pattern of movement; and
   performing one or more actions responsive to the contact matching the second predetermined pattern of movement.

8. The method of claim 1, wherein performing the one or more predetermined actions comprises at least one of unlocking the computing device, unlocking content on the computing device, unlocking access to an application on the computing device, or operating the computing device at a predetermined privilege level.

9. The method of claim 1, wherein the number of times which the first type of movement, the second type of movement, or both are to be performed is determined responsive to detecting contact with the touchscreen.

10. The method of claim 1, wherein the number of times which the first type of movement, the second type of movement, or both are to be performed is determined using a random or pseudorandom algorithm.

11. The method of claim 10, wherein the at least indicator presents predetermined content to signal that the first type of movement or the second type of movement has been performed the number of times determined by the random or pseudorandom algorithm and presents content other than the predetermined content to signal that the first type of movement or the second type of movement has not been performed the number of times determined by the random or pseudorandom algorithm.

12. A computing device comprising:
means for detecting contact with a touchscreen of the computing device;
means for monitoring the contact with the touchscreen to determine whether the contact matches a predetermined pattern of movement, the predetermined pattern of movement comprising a plurality of predetermined movements separated by pivot points, the pivot points representing a transition point in the predetermined pattern of movement from a first type of movement to a second type of movement, wherein a number of times which the first type of movement, the second type of movement, or both are to be performed is variable, and wherein the contact with the touchscreen is broken at one or more of
at least one pivot point,
between a first instance of the first type of movement and a second instance of the first type of movement, or
between a first instance of the second type of movement and a second instance of the second type of movement;
means for presenting at least one indicator that is updated responsive to each movement and that provides a signal when a pivot point has been reached; and
means for performing one or more predetermined actions responsive to the contact with the touchscreen matching the predetermined pattern of movement.

13. The computing device of claim 12, wherein the means for monitoring comprises means for determining whether the first type of movement has been performed a predetermined number of times before a pivot point in the predetermined pattern of movement.

14. The computing device of claim 13, further comprising means for recording movements of an authorized user of the computing device while operating in a record pattern mode to generate the predetermined pattern of movement, wherein the means for recording comprises means for determining the predetermined number of times that the first type of movement is performed based on the movements of the authorized user.

15. The computing device of claim 12, wherein the means for monitoring comprises means for determining whether the first type of movement has been performed a variable number of times before a pivot point in the predetermined pattern of movement.

16. The computing device of claim 15, further comprising:
means for determining the number of times that the first type of movement is to be performed before reaching the pivot point based on the predetermined pattern of movement.

17. The computing device of claim 12, wherein the at least one indicator comprises one or more of a color, letter, shape, number, sound, haptic feedback, or other indicator known to an authorized user of the computing device.

18. The computing device of claim 12, further comprising:
means for monitoring the contact with the touchscreen to determine whether the contact matches a second predetermined pattern of movement; and
means for performing one or more actions responsive to the contact matching the second predetermined pattern of movement.

19. The computing device of claim 12, wherein the means for performing the one or more predetermined actions comprises at least one of means for unlocking the computing device or means for unlocking a file.

20. A computing device comprising:
a memory; and
at least one processor coupled to the memory, the at least one processor being configured to:
detect contact with a touchscreen of the computing device;
monitor the contact with the touchscreen to determine whether the contact matches a predetermined pattern of movement, the predetermined pattern of movement comprising a plurality of predetermined movements separated by pivot points, the pivot points representing a transition point in the predetermined pattern of movement from a first type of movement to a second type of movement, wherein a number of times which the first type of movement, the second type of movement, or both are to be performed is variable, and wherein the contact with the touchscreen is broken at one or more of
at least one pivot point,
between a first instance of the first type of movement and a second instance of the first type of movement, or
between a first instance of the second type of movement and a second instance of the second type of movement;
present at least one indicator that is updated responsive to each movement and that provides a signal when a pivot point has been reached; and
perform one or more predetermined actions responsive to the contact with the touchscreen matching the predetermined pattern of movement.

21. The computing device of claim 20, wherein the at least one processor is configured to determine whether the first type of movement has been performed a predetermined number of times before a pivot point in the predetermined pattern of movement.

22. The computing device of claim 21, wherein the at least one processor is further configured to:
record movements of an authorized user of the computing device while operating in a record pattern mode to generate the predetermined pattern of movement; and
determine the predetermined number of times that the first type of movement is performed based on the movements of the authorized user.

23. The computing device of claim 19, wherein the at least one processor is configured to determine whether the first type of movement has been performed a variable number of times before a pivot point in the predetermined pattern of movement, the variable number of times being determined after detecting the contact with the touchscreen.

24. The computing device of claim 23, wherein the at least one processor is further configured to:
determine the number of times that the first type of movement is to be performed before reaching the pivot point based on the predetermined pattern of movement.

25. The computing device of claim 19, wherein the at least one processor is further configured to:
- monitor the contact with the touchscreen to determine whether the contact matches a second predetermined pattern of movement; and
- perform one or more actions responsive to the contact matching the second predetermined pattern of movement.

26. The computing device of claim 19, wherein the at least one processor being configured to perform the one or more predetermined actions is configured to at least one of unlock the computing device or unlock a file.

27. A non-transitory, computer-readable medium, having stored thereon computer-readable instructions for securing a computing device, comprising instructions configured to cause a computer the computing device to:
- detect contact with a touchscreen of the computing device;
- monitor the contact with the touchscreen to determine whether the contact matches a predetermined pattern of movement, the predetermined pattern of movement comprising a plurality of predetermined movements separated by pivot points, the pivot points representing a transition point in the predetermined pattern of movement from a first type of movement to a second type of movement, wherein a number of times which the first type of movement, the second type of movement, or both are to be performed is variable, and wherein the contact with the touchscreen is broken at one or more of
    - at least one pivot point,
    - between a first instance of the first type of movement and a second instance of the first type of movement, or
    - between a first instance of the second type of movement and a second instance of the second type of movement;
- present at least one indicator that is updated responsive to each movement and that provides a signal when a pivot point has been reached; and
- perform one or more predetermined actions to the contact with the touchscreen matching the predetermined pattern of movement.

28. The non-transitory, computer-readable medium of claim 27, wherein the instructions configured to cause the computing device to monitor the contact with the touchscreen to determine whether the contact matches the predetermined pattern of movement further comprises instructions configured to cause the computer to determine whether the first type of movement has been performed a predetermined number of times before a pivot point in the predetermined pattern of movement.

29. The non-transitory, computer-readable medium of claim 28, further comprising instructions configured to cause the computing device to:
- record movements of an authorized user of the computing device while operating in a record pattern mode to generate the predetermined pattern of movement; and
- determine the predetermined number of times that the first type of movement is performed based on the movements of the authorized user.

30. The non-transitory, computer-readable medium of claim 27, wherein the instructions configured to cause the computing device to monitor the contact with the touchscreen to determine whether the contact matches the predetermined pattern of movement further comprises instructions configured to cause the computer to determine whether the first type of movement has been performed a variable number of times before a pivot point in the predetermined pattern of movement, the variable number of times being determined after detecting the contact with the touchscreen.

31. The non-transitory, computer-readable medium of claim 30, further comprising instructions configured to cause the computing device to:
- determine the number of times that the first type of movement is to be performed before reaching the pivot point based on the predetermined pattern of movement.

* * * * *